US010466800B2

(12) United States Patent
Matsubara et al.

(10) Patent No.: US 10,466,800 B2
(45) Date of Patent: Nov. 5, 2019

(54) VEHICLE INFORMATION PROCESSING DEVICE

(71) Applicant: CLARION CO., LTD, Saitama-shi, Saitama (JP)

(72) Inventors: Takashi Matsubara, Tokyo (JP); Shintaro Takada, Tokyo (JP); Naoki Mori, Tokyo (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 15/551,308

(22) PCT Filed: Feb. 1, 2016

(86) PCT No.: PCT/JP2016/052916
§ 371 (c)(1),
(2) Date: Aug. 16, 2017

(87) PCT Pub. No.: WO2016/132876
PCT Pub. Date: Aug. 25, 2016

(65) Prior Publication Data
US 2018/0059798 A1    Mar. 1, 2018

(30) Foreign Application Priority Data

Feb. 20, 2015   (JP) .................................. 2015-031324

(51) Int. Cl.
*G06F 3/01*        (2006.01)
*G02B 27/01*      (2006.01)
(Continued)

(52) U.S. Cl.
CPC .......... *G06F 3/017* (2013.01); *G02B 27/0101* (2013.01); *G06K 9/00355* (2013.01);
(Continued)

(58) Field of Classification Search
CPC ............ G06F 3/017; B60K 2350/1052; B60K 2370/146; B60K 2370/148;
(Continued)

(56) References Cited

U.S. PATENT DOCUMENTS 7,834,857 B2 * 11/2010 Prados .................. B60K 35/00
                                                        345/173
8,094,189 B2 *  1/2012 Kumon ................. B60K 35/00
                                                        348/115
(Continued)

FOREIGN PATENT DOCUMENTS

CN          101855521 A      10/2010
JP          2005-174356 A     6/2005
(Continued)

OTHER PUBLICATIONS

Japanese Office Action dated Apr. 3, 2018 for the Japanese Patent Application No. 2015-031324.
(Continued)

*Primary Examiner* — David E Harvey
(74) *Attorney, Agent, or Firm* — Volpe and Koenig, P.C.

(57) ABSTRACT

An in-vehicle device includes a gesture detection unit for recognizing a user's hand at a predetermined range; an information control unit controlling information output to a display; and an in-vehicle device control unit receiving input from a control unit equipped in a vehicle to control the in-vehicle device. When the gesture detection unit detects a user's hand at a predetermined position, the output information control unit triggers the display to display candidates of an operation executed by the in-vehicle device control unit by associating the candidates with the user's hand motions. When the gesture detection unit detects the user's hand, and the user's hand has thereafter moved from the position, the information control unit changes a selection method or a control guide of the operation to be executed by (Continued)

the in-vehicle device control unit, which is displayed on the display, to subject matter which matches the control unit.

7 Claims, 56 Drawing Sheets

(51) Int. Cl.
  *G06K 9/00* (2006.01)
  *G06K 9/46* (2006.01)
(52) U.S. Cl.
  CPC ........... *G06K 9/00389* (2013.01); *G06K 9/46* (2013.01); *G02B 2027/0138* (2013.01)
(58) Field of Classification Search
  CPC .......... B60K 2370/143; G02B 27/0101; G06K 9/00355; G06K 9/00389; G06K 9/46
  See application file for complete search history.

(56) References Cited

U.S. PATENT DOCUMENTS

| | | | | |
|---|---|---|---|---|
| 8,165,886 | B1* | 4/2012 | Gagnon | G10L 15/19 704/275 |
| 8,849,506 | B2* | 9/2014 | Suzuki | G06F 3/017 345/173 |
| 8,891,868 | B1* | 11/2014 | Ivanchenko | G06F 3/017 382/168 |
| 9,103,691 | B2 | 8/2015 | Waller et al. | |
| 10,013,143 | B2* | 7/2018 | Benko | G06F 3/04883 |
| 10,180,729 | B2* | 1/2019 | Park | G06K 9/00355 |
| 2004/0141634 | A1* | 7/2004 | Yamamoto | B60K 37/06 382/104 |
| 2005/0063564 | A1* | 3/2005 | Yamamoto | B60R 25/2045 382/104 |
| 2007/0252898 | A1* | 11/2007 | Delean | G06F 3/005 348/211.99 |
| 2010/0238280 | A1 | 9/2010 | Ishii | |
| 2011/0022393 | A1 | 1/2011 | Waller et al. | |
| 2011/0118877 | A1* | 5/2011 | Hwang | B25J 13/00 700/264 |
| 2011/0260965 | A1* | 10/2011 | Kim | G06F 3/013 345/156 |
| 2012/0210214 | A1* | 8/2012 | Yoo | G06F 3/0482 715/702 |
| 2012/0224060 | A1* | 9/2012 | Gurevich | B60R 1/00 348/148 |
| 2012/0260172 | A1* | 10/2012 | Friedlander | H04N 21/4314 715/719 |
| 2012/0312956 | A1* | 12/2012 | Chang | G06F 3/017 250/201.1 |
| 2013/0033643 | A1* | 2/2013 | Kim | G06F 3/017 348/563 |
| 2013/0097557 | A1 | 4/2013 | Madau et al. | |
| 2013/0134730 | A1* | 5/2013 | Ricci | H04W 4/90 296/24.34 |
| 2013/0241847 | A1* | 9/2013 | Shaffer | G06F 3/038 345/173 |
| 2013/0271397 | A1* | 10/2013 | MacDougall | G06F 3/017 345/173 |
| 2013/0275924 | A1* | 10/2013 | Weinberg | G06F 3/017 715/863 |
| 2014/0124647 | A1* | 5/2014 | Hsu | G06F 3/0304 250/206.1 |
| 2014/0172231 | A1* | 6/2014 | Terada | G06F 3/005 701/36 |
| 2014/0181759 | A1* | 6/2014 | Kim | B60K 35/00 715/863 |
| 2014/0368423 | A1* | 12/2014 | Brenckle | G06F 3/017 345/156 |
| 2015/0135079 | A1* | 5/2015 | Oh | G06F 3/0482 715/727 |
| 2015/0186717 | A1* | 7/2015 | Joo | G06K 9/00389 382/103 |
| 2016/0023604 | A1* | 1/2016 | Jenson | G06F 3/0488 345/7 |
| 2016/0132126 | A1* | 5/2016 | van Laack | G06F 3/0304 345/156 |
| 2017/0349099 | A1* | 12/2017 | Kunze | B60R 1/00 |
| 2017/0368938 | A1* | 12/2017 | Wild | B60K 35/00 |
| 2018/0059798 | A1* | 3/2018 | Matsubara | B60K 35/00 |

FOREIGN PATENT DOCUMENTS

| | | |
|---|---|---|
| JP | 2010-129069 A | 6/2010 |
| JP | 2010-184600 A | 8/2010 |
| JP | 2010-215194 A | 9/2010 |
| JP | 2011-118725 A | 6/2011 |
| JP | 2011-198210 A | 10/2011 |
| JP | 2013-131237 A | 7/2013 |
| JP | 2013-178847 A | 9/2013 |
| JP | 2014-174818 A | 9/2014 |
| JP | 2014-215644 A | 11/2014 |
| WO | 2009/012814 A1 | 1/2009 |

OTHER PUBLICATIONS

International Search Report, PCT/JP2016/052916, dated Apr. 19, 2016, 1 pg.
Chinese Office Action dated Jan. 9, 2019 for the Chinese Patent Application No. 201680004230.2.
Extended European Search Report dated Aug. 7, 2018 for the European Patent Application No. 16752264.8.
Perry, "Mode-Switching in Multimodal Systems," (Jan. 1, 2006), Available at: http://people.brunel.ac.uk/~cssrmjp/homefiles/selected-publications/mode-switching.pdf.

* cited by examiner

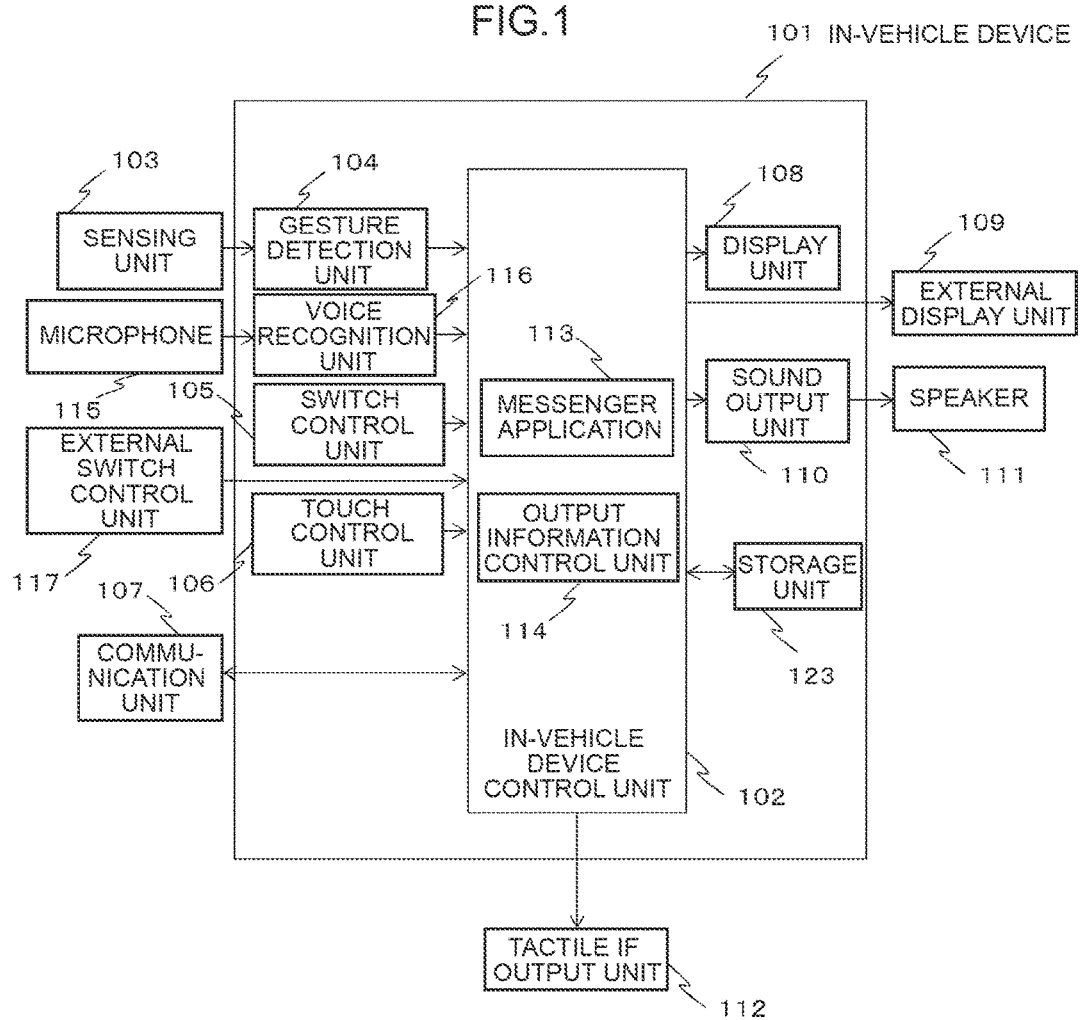

FIG.2(a)
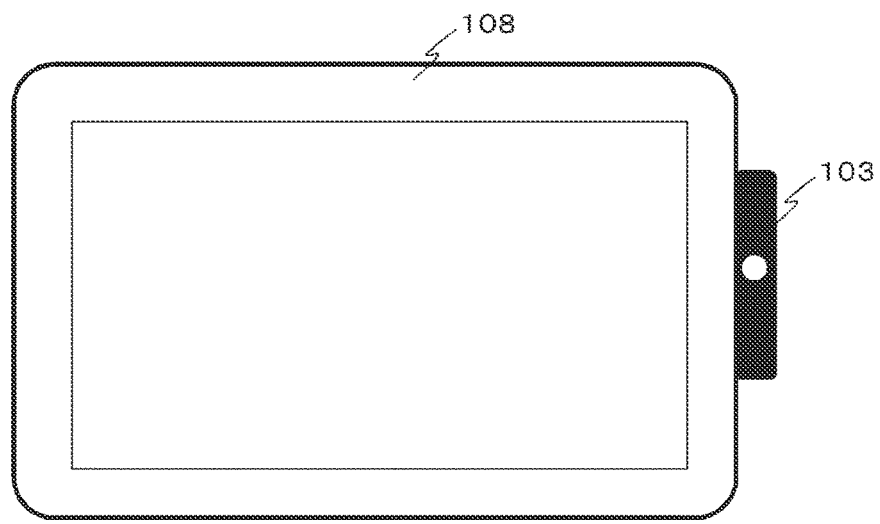
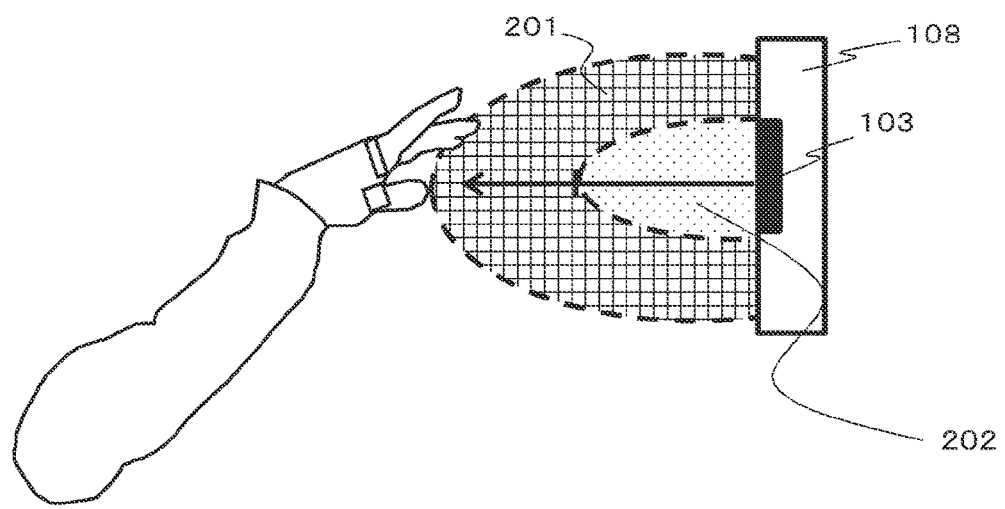

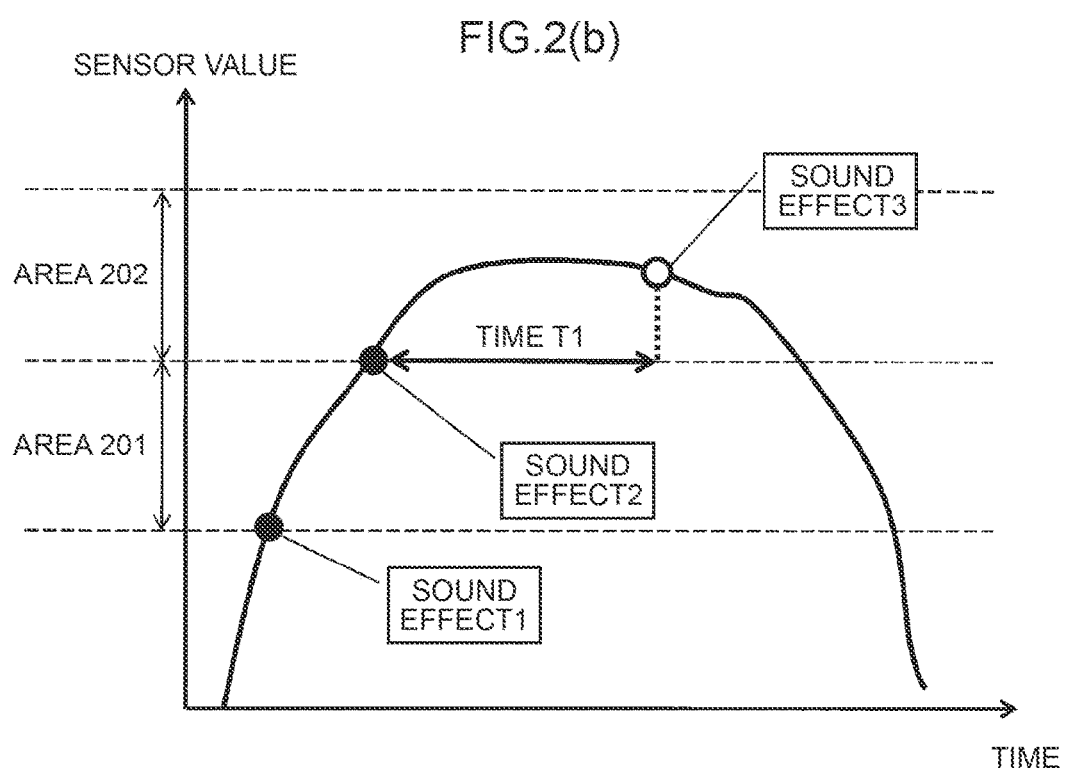

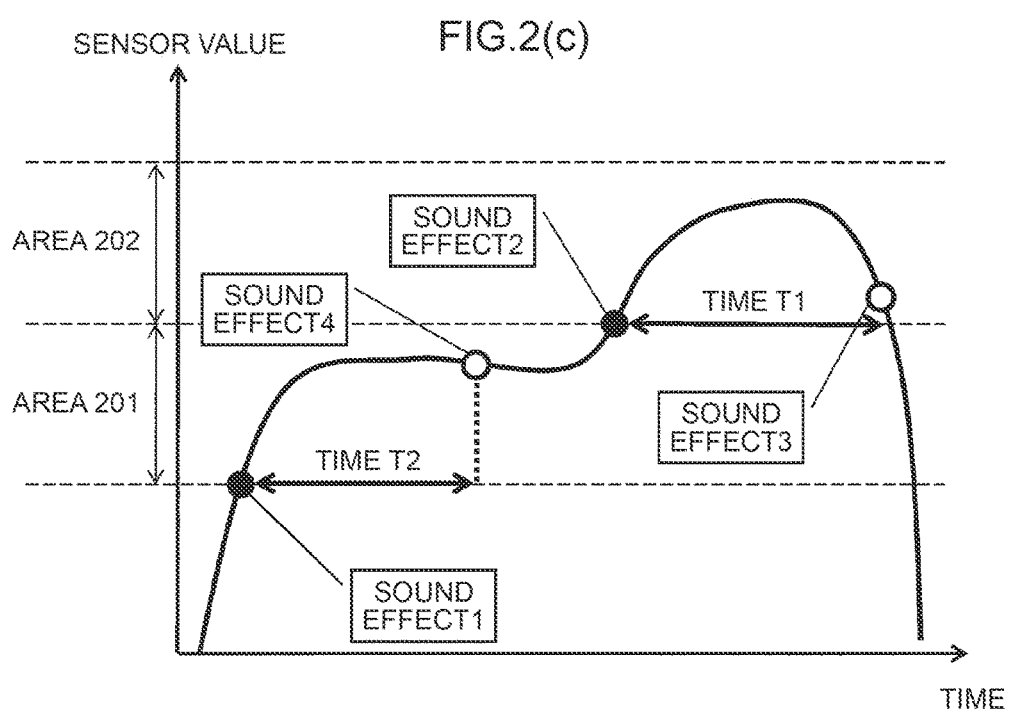

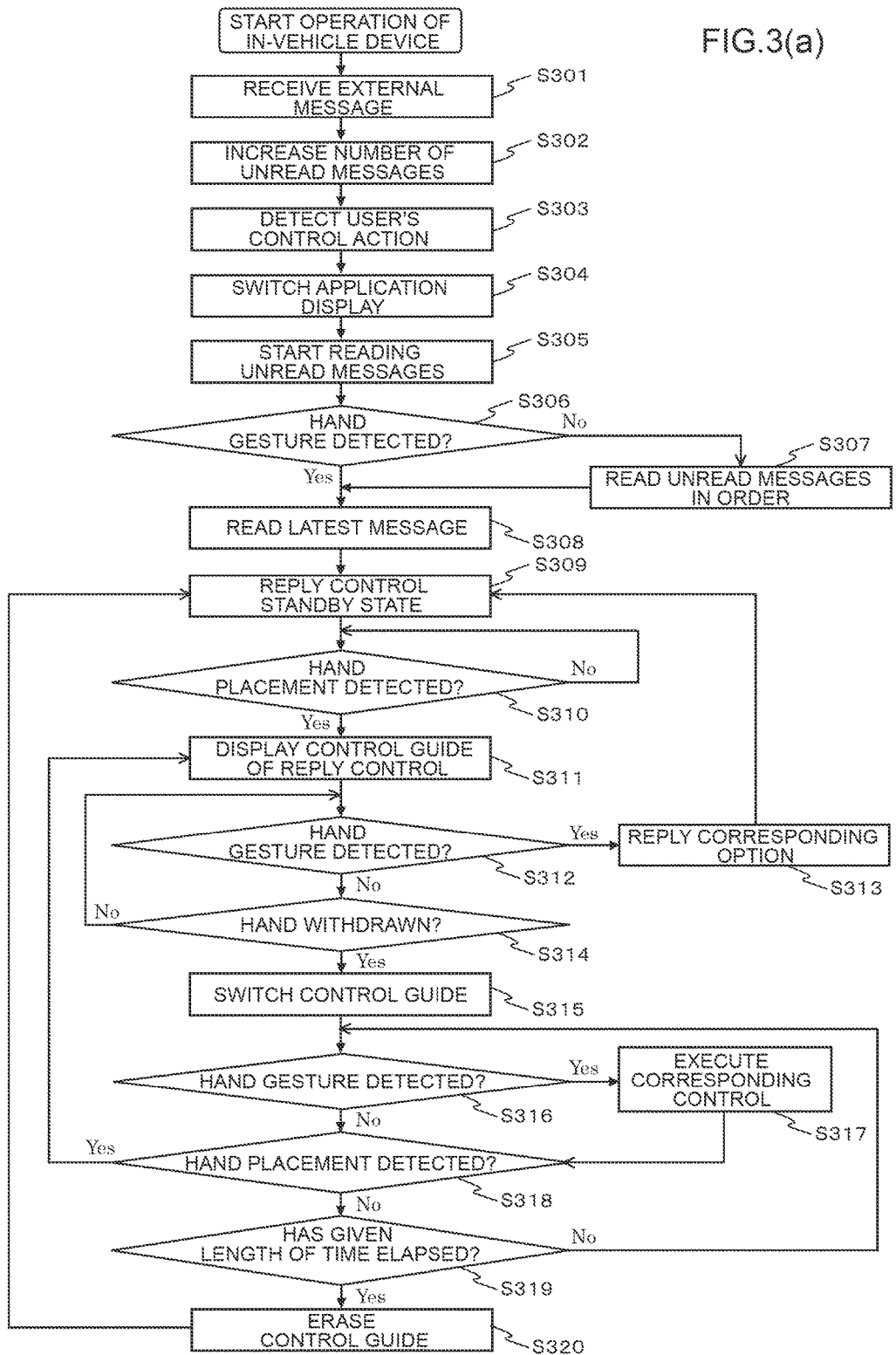

FIG.4(d)
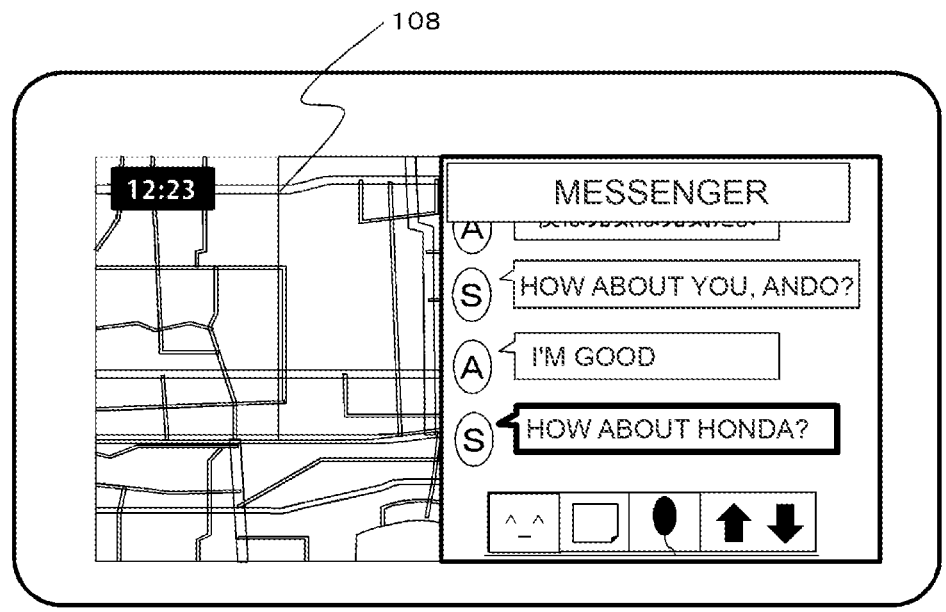
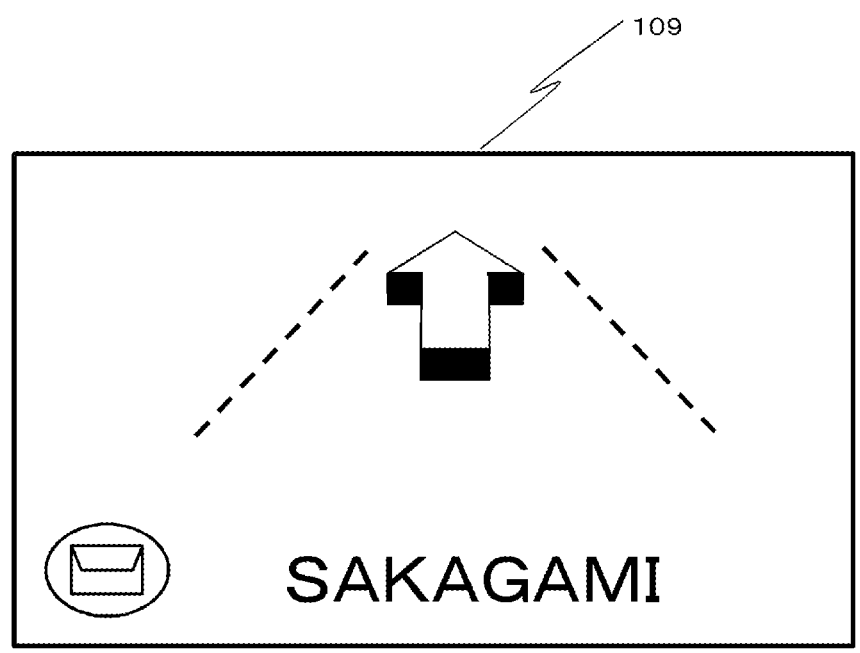

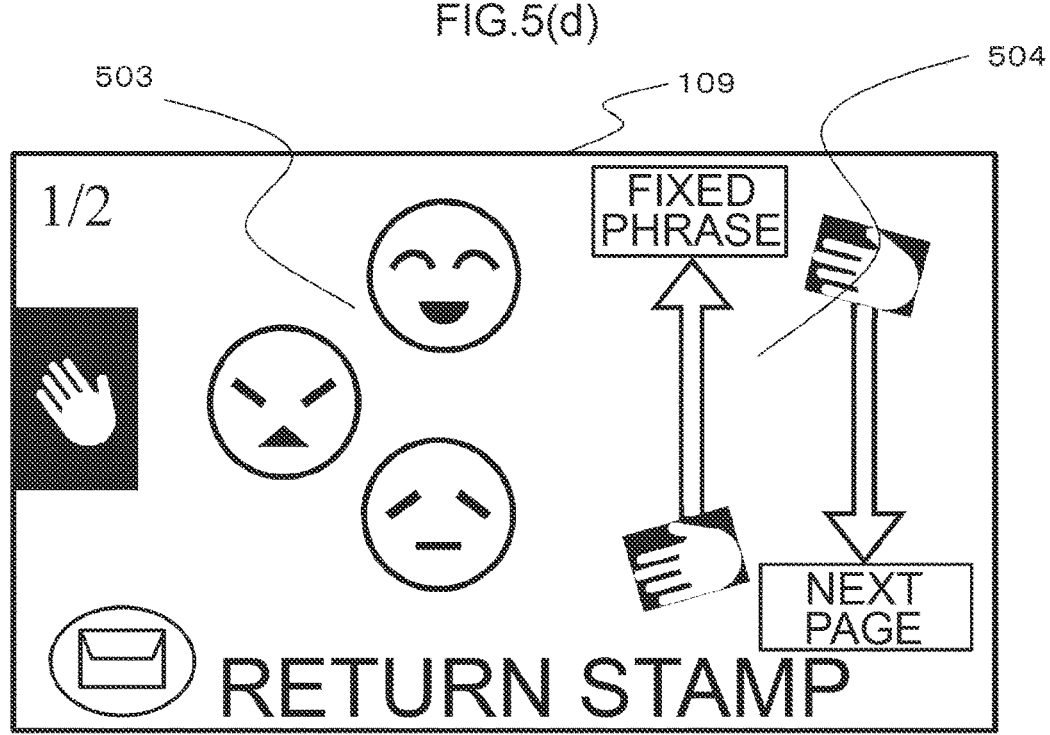

FIG.6
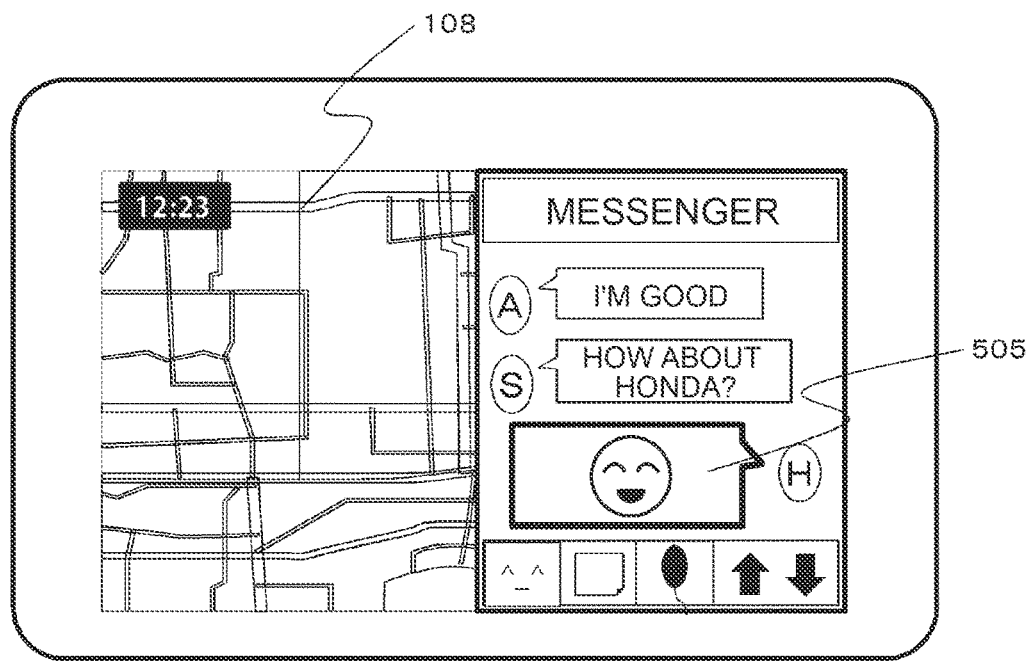
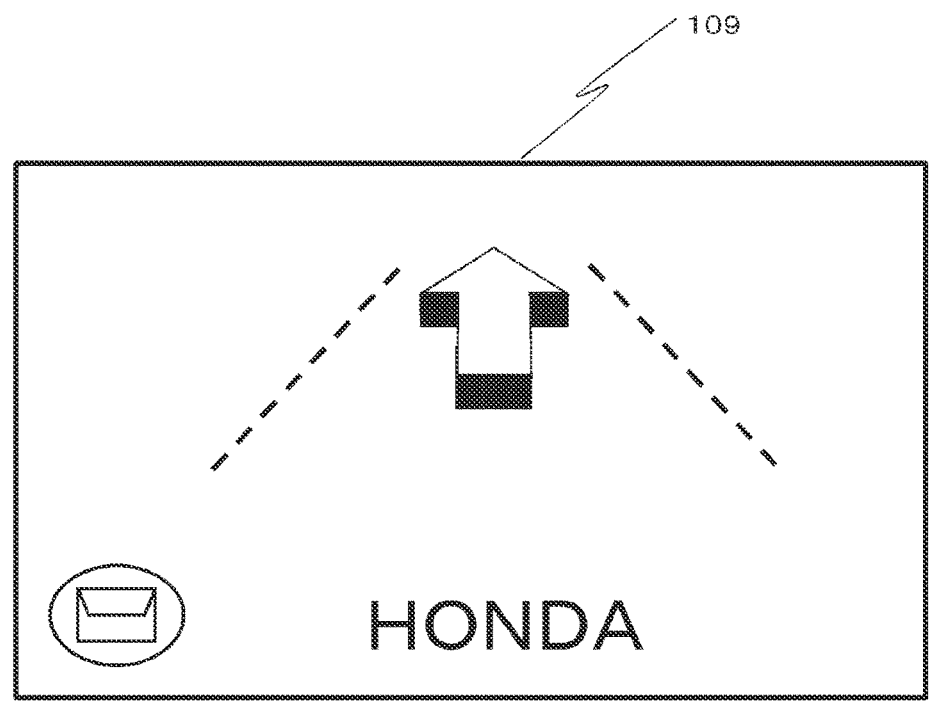

FIG.8(b)

| LOCK POSITION | 103A | 103B | 103C |
|---|---|---|---|
| START CONTROL | RETURN STAMP | RETURN FIXED PHRASE | RETURN FREE SPEECH |

FIG.9
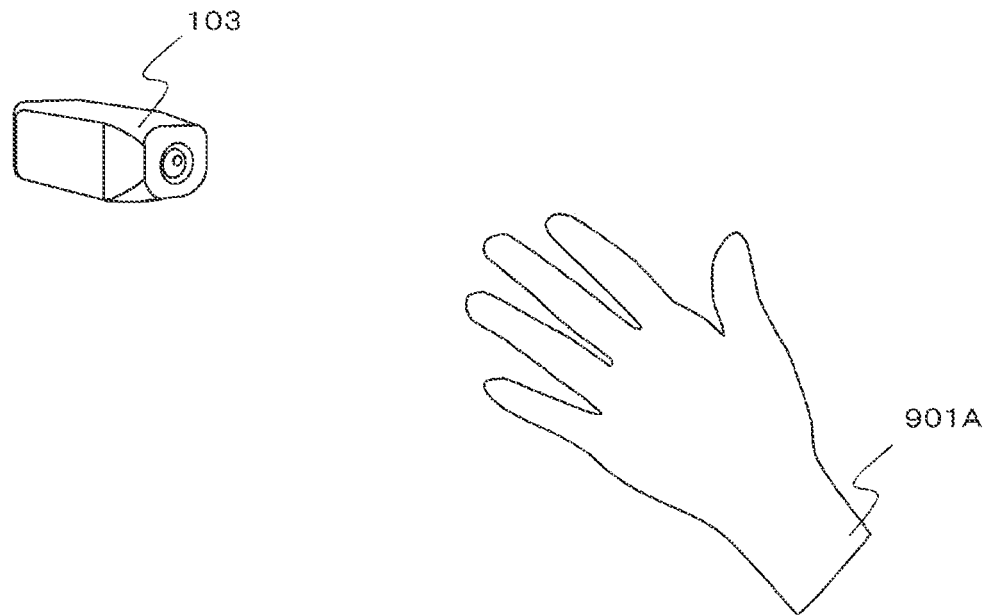
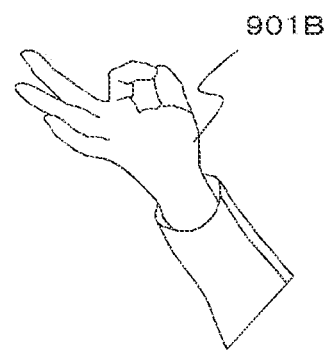
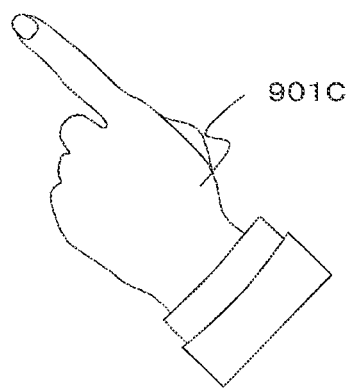

FIG.11(b)

| DISPLAY | HUD | METER DISPLAY | CENTER DISPLAY |
|---|---|---|---|
| INSTALLATION POSITION | FRONT WINDSHIELD | METER | CENTER DISPLAY |
| CONNECTION STATUS | ○ | ○ | ○ |
| PRIORITY | 1 | 2 | 3 |

FIG.11(c)

| DISPLAY | HUD | SMART PHONE | METER DISPLAY | CENTER DISPLAY |
|---|---|---|---|---|
| INSTALLATION POSITION | FRONT WINDSHIELD | FRONT PART | METER | CENTER DISPLAY |
| CONNECTION STATUS | × | ○ | ○ | ○ |
| PRIORITY | — | 1 | 2 | 3 |

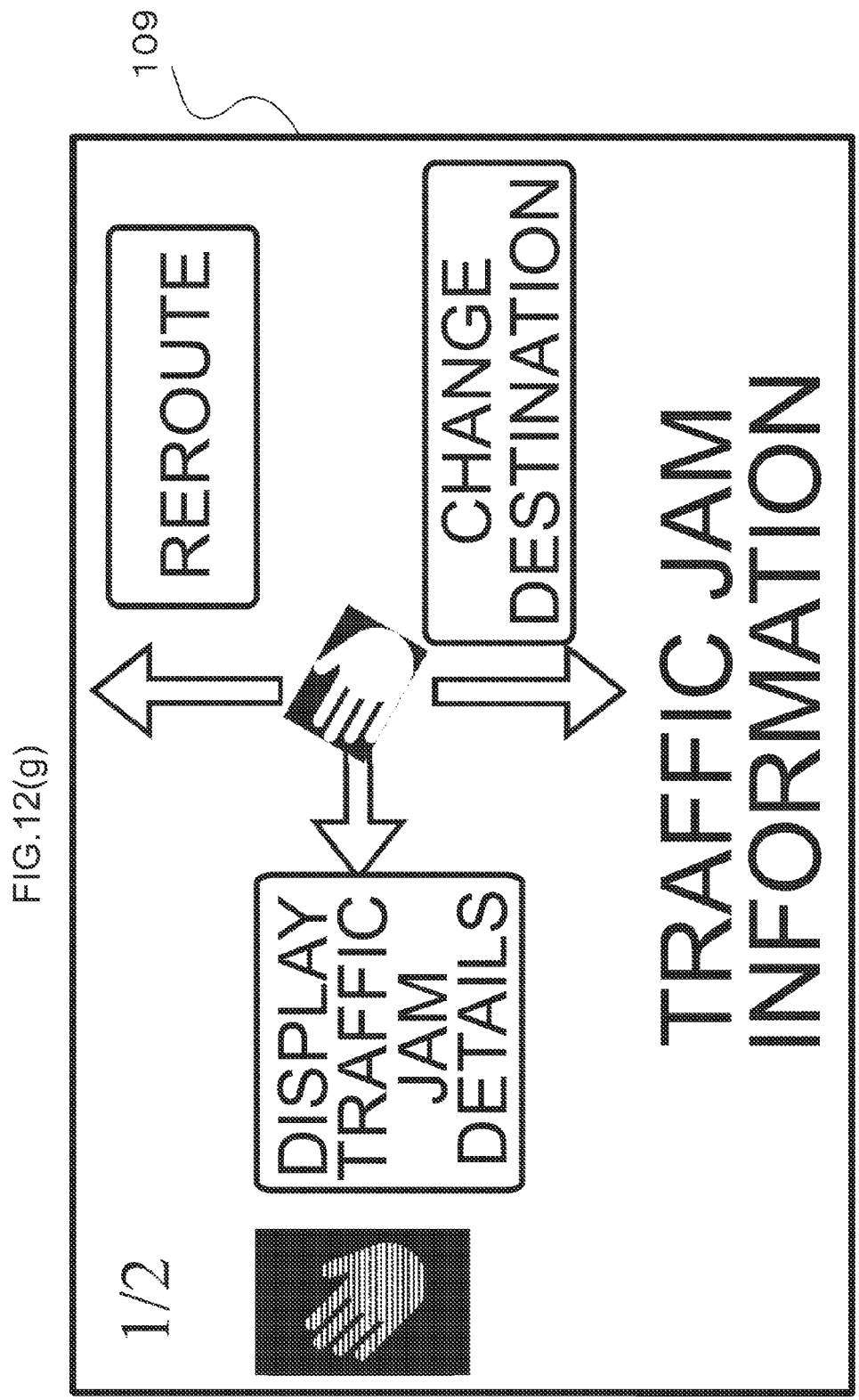

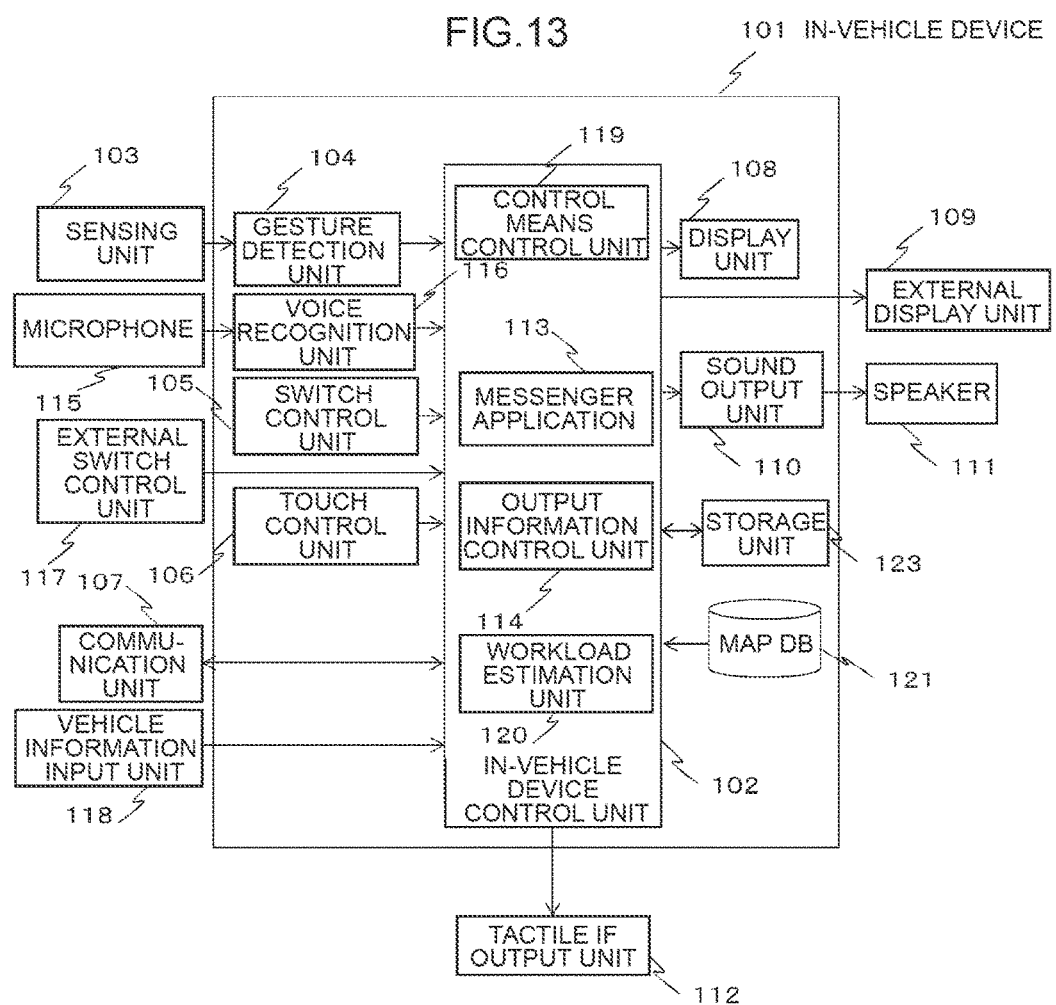

FIG.14(a)

AVAILABILITY OF RESPECTIVE CONTROL MEANS
AT RESPECTIVE WORKLOAD LEVELS

| | | WORKLOAD LEVEL | | | |
|---|---|---|---|---|---|
| | | NONE | LOW | MEDIUM | HIGH |
| CONTROL MEANS | HAND GESTURE | ○ | ○ | ○ | × |
| | HAND PLACEMENT | ○ | ○ | × | × |
| | GESTURE (AFTER HAND PLACEMENT) | ○ | ○ | × | × |
| | SELECTION OF OPTION BASED ON SWITCH CONTROL | ○ | ○ | ○ (ONLY MIDWAY DURING CONTROL) | × |
| | SELECTION OF OPTION BASED ON VOICE RECOGNITION | ○ | ○ | ○ (ONLY MIDWAY DURING CONTROL) | × |
| | FREE SPEECH REPLY BASED ON VOICE RECOGNITION | ○ | ○ | ○ | × |

FIG.14(b)

CONTENTS PRESENTED ON CENTER DISPLAY

| | | WORKLOAD LEVEL | | | |
|---|---|---|---|---|---|
| | | NONE | LOW | MEDIUM | HIGH |
| APPLICATION STATUS | UPON DISPLAYING AND READING MESSAGE | SENDER AND MESSAGE | ONLY SENDER | ONLY SENDER | × |
| | UPON REPLY CONTROL | DISPLAY OPTION | × | × | × |

FIG.14(c)

CONTENTS PRESENTED ON HUD

| | | WORKLOAD LEVEL | | | |
|---|---|---|---|---|---|
| | | NONE | LOW | MEDIUM | HIGH |
| APPLICATION STATUS | UPON DISPLAYING AND READING MESSAGE | ONLY SENDER | ONLY SENDER | ONLY SENDER | × |
| | UPON REPLY CONTROL | DISPLAY OPTION | DISPLAY OPTION | ·DISPLAY OPTION (ONLY MIDWAY DURING CONTROL) ·CONTROL PROHIBITED | × |

FIG.14(d)

CONTENTS PRESENTED FROM SPEAKER

| | | WORKLOAD LEVEL | | | |
|---|---|---|---|---|---|
| | | NONE | LOW | MEDIUM | HIGH |
| APPLICATION STATUS | UPON DISPLAYING AND READING MESSAGE | SENDER AND MESSAGE | SENDER AND MESSAGE | SENDER AND MESSAGE | WARNING TONE |
| | UPON REPLY CONTROL | CONTROL TONE | CONTROL TONE | CONTROL TONE | WARNING TONE |

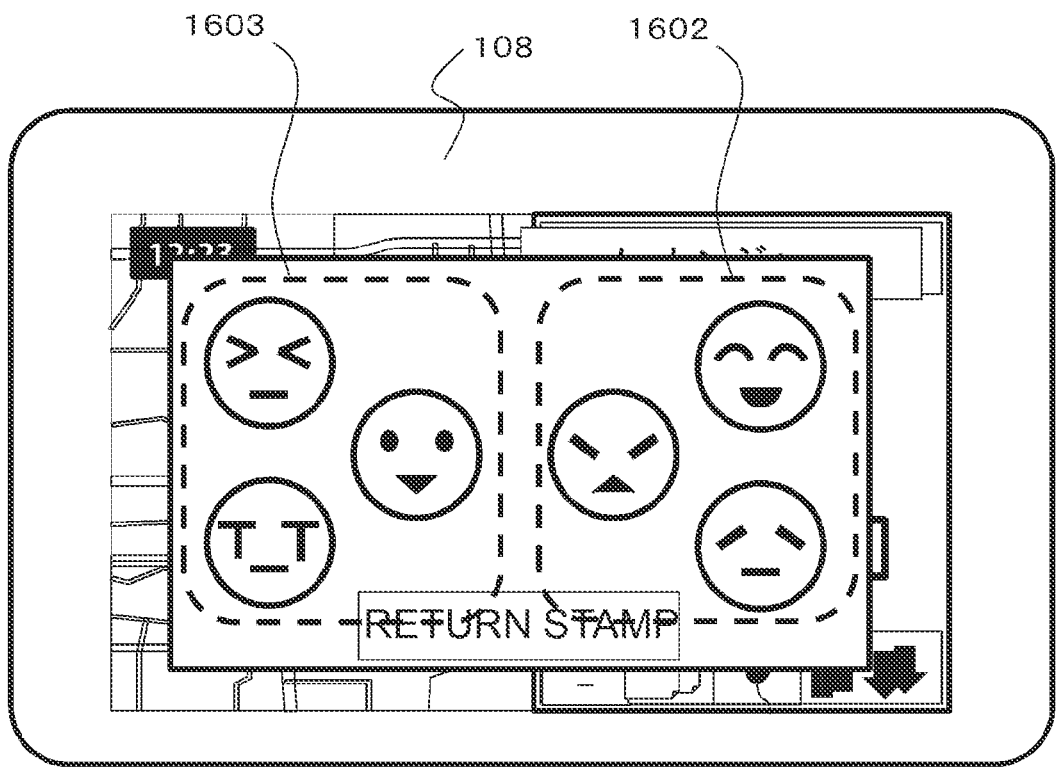

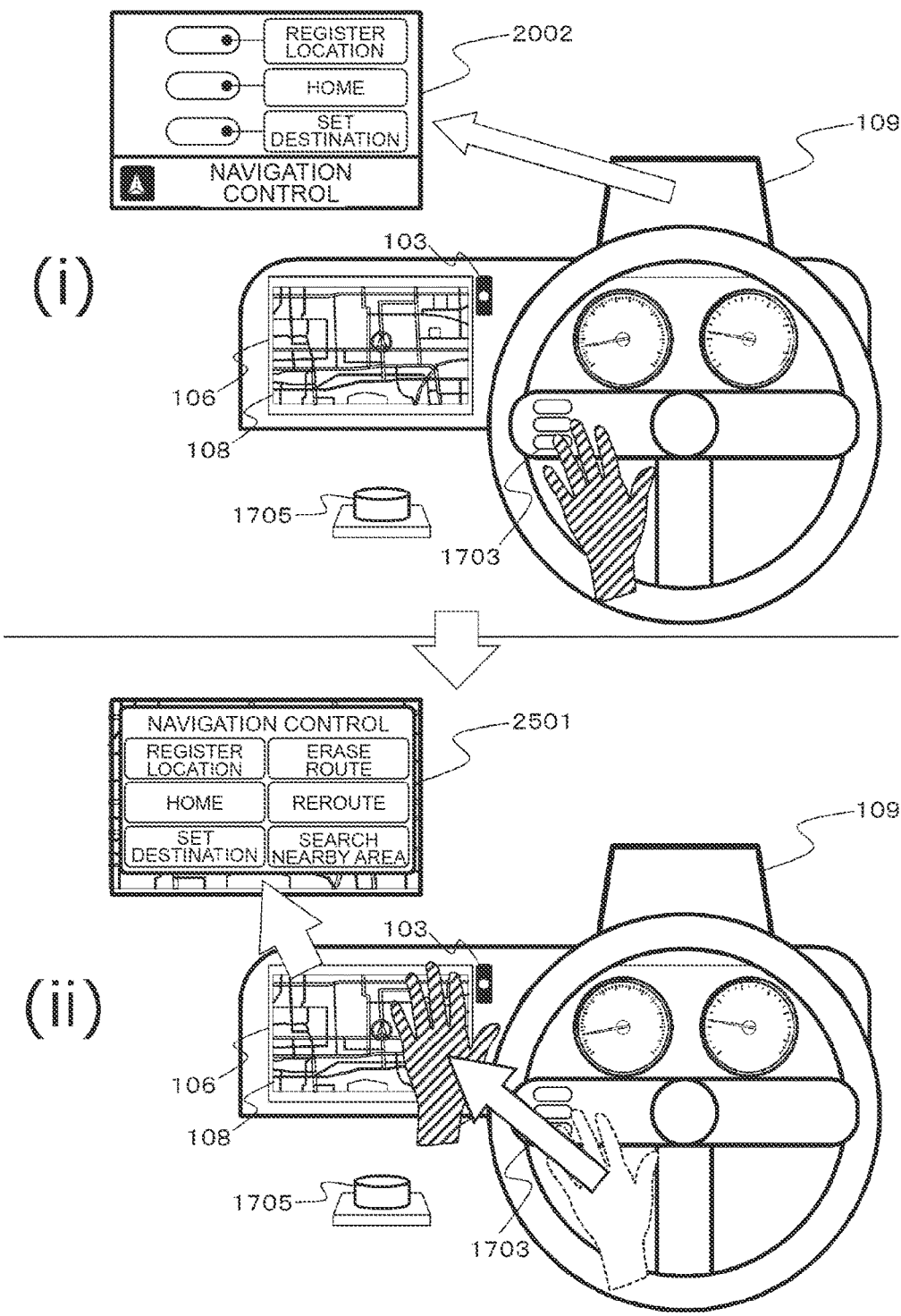

FIG.26(a)
SELECTION OF CONTROL DEVICE ACCORDING
TO APPROACH OF HAND TO SPECIFIC DEVICE

| | | CONTROL DEVICE | | |
|---|---|---|---|---|
| | | GESTURE | STEERING CONTROLLER | COMMANDER CONTROLLER |
| GESTURE DETECTION STATUS | HAND IS NEAR SENSING UNIT | ○ | — | — |
| | HAND IS WITHDRAWN FROM SENSING UNIT | — | ○ (SELECT SPECIFIC DEVICE) | |

FIG.26(b)

SELECTION OF CONTROL DEVICE ACCORDING TO HAND POSITION/MOVING DIRECTION

| | | CONTROL DEVICE | | |
|---|---|---|---|---|
| | | GESTURE | STEERING CONTROLLER | COMMANDER CONTROLLER |
| GESTURE DETECTION STATUS | HAND IS NEAR SENSING UNIT | ◯ | — | — |
| | HAND MOVED TOWARD STEERING CONTROLLER | — | ◯ | — |
| | HAND MOVED TOWARD COMMANDER CONTROLLER | — | — | ◯ |

FIG.26(c)

SELECTION OF CONTROL DEVICE/DISPLAY DEVICE
ACCORDING TO DRIVING/STOPPED STATE

| | | DRIVING/STOPPED STATE | | | |
|---|---|---|---|---|---|
| | | TOUCH/ CENTER SCREEN → HIGH OPERABILITY | GESTURE/ HUD → HIGH SAFETY (MINIMAL VISUAL LINE MOVEMENT) | STEERING CONTROLLER/ HUD → HIGH SAFETY (MINIMAL VISUAL LINE MOVEMENT) | COMMANDER/ HUD → HIGH SAFETY (MINIMAL VISUAL LINE MOVEMENT) |
| DRIVING/STOPPED STATE | DRIVING | — | ○ | ○ | ○ |
| | STOPPED | ○ | — | — | — |

VEHICLE INFORMATION PROCESSING DEVICE

TECHNICAL FIELD

The present invention relates to an information processing device.

BACKGROUND ART

PTL 1 describes a control device of in-vehicle equipment which superimposes and displays, on a head up display (HUD), the control menu of the in-vehicle equipment and the projected image of the driver's hand placed on the control unit, and thereby allows the driver to control the control unit while viewing the projected image to simplify and facilitate the selection control of the in-vehicle equipment so that such control will not interfere with the driving of the vehicle.

CITATION LIST

Patent Literature

[PTL 1] Japanese Laid-Open Patent Publication No. 2010-215194

SUMMARY OF THE INVENTION

Technical Problem

Nevertheless, when controlling the in-vehicle equipment while driving a vehicle, with the technology described in PTL 1, because the control menu is constantly displayed on the HUD, such display of the control menu may interfere with the driving operation.

Moreover, in order to perform controls, a dedicated device for performing controls must be installed somewhere within the vehicle, and, in addition to increased costs, there are restrictions in the mounting of such device. Furthermore, even in cases of using a voice-only interface, processing time of the processing required for voice recognition and time for listening to the emitted voice are required, and the controllability and convenience are impaired.

Solution to Problem

According to the present invention, an in-vehicle device, comprises: a gesture detection unit which recognizes a position of a user's hand located within a predetermined range; an output information control unit which controls output information to be output to a display unit; and an in-vehicle device control unit which receives an input from a control unit equipped in a vehicle and thereby controls the in-vehicle device, wherein: when the gesture detection unit detects that the user's hand has been placed at a predetermined position for a given length of time, the output information control unit triggers the display unit to display candidates of an operation to be executed by the in-vehicle device control unit by associating the candidates with motions of the user's hand; and when the gesture detection unit detects that the user's hand has been placed at the predetermined position for a given length of time and the user's hand has thereafter been moved from the predetermined position, the output information control unit changes a selection method or a control guide of the operation to be executed by the in-vehicle device control unit, which is displayed on the display unit, to subject matter which matches the control unit.

Advantageous Effects of Invention

According to the present invention, it is possible to improve the safety and controllability of the control of in-vehicle equipment by a driver who is driving a vehicle.

BRIEF DESCRIPTION OF DRAWINGS

FIG. 1 is a configuration diagram of an in-vehicle device in the first embodiment of the present invention.

FIG. 2(a) shows an example of an installation position of a sensing unit.

FIG. 2(b) shows an example of gesture detection areas.

FIG. 2(c) shows an example of gesture detection areas.

FIG. 3(a) shows an example of an operation flow in the first embodiment.

FIG. 4(d) shows a display example of a display unit and an external display unit.

FIG. 5(d) shows a display example of an external display unit.

FIG. 6 shows a display example of a display unit and an external display unit.

FIG. 8(b) shows a correspondence example of operations according to the position of a sensing unit.

FIG. 9 shows an example of a sensing unit and shapes of a user's hand.

FIG. 11(b) shows an example of display locations of the displayed contents.

FIG. 11(c) shows an example of display locations of the displayed contents.

FIG. 12(g) shows a display example of an external display unit.

FIG. 13 shows a configuration diagram of an in-vehicle device in the second embodiment.

FIG. 14(a) shows an example of a control pattern according to a workload level.

FIG. 14(b) shows an example of a control pattern according to a workload level.

FIG. 14(c) shows an example of a control pattern according to a workload level.

FIG. 14(d) shows an example of a control pattern according to a workload level.

FIG. 16(b) shows a display example of an external display unit.

FIG. 25 shows an example of a control method based on a steering controller and a touch panel.

FIG. 26(a) shows a table indicating a selection method of a control device according to the approach of a user's hand to a specific device.

FIG. 26(b) shows a table indicating a selection method of a control device according to the position and moving direction of a user's hand.

FIG. 26(c) shows a table indicating a selection method of a control device and a display device according to the driving/stopped state.

DESCRIPTION OF EMBODIMENTS

Figure 3B:
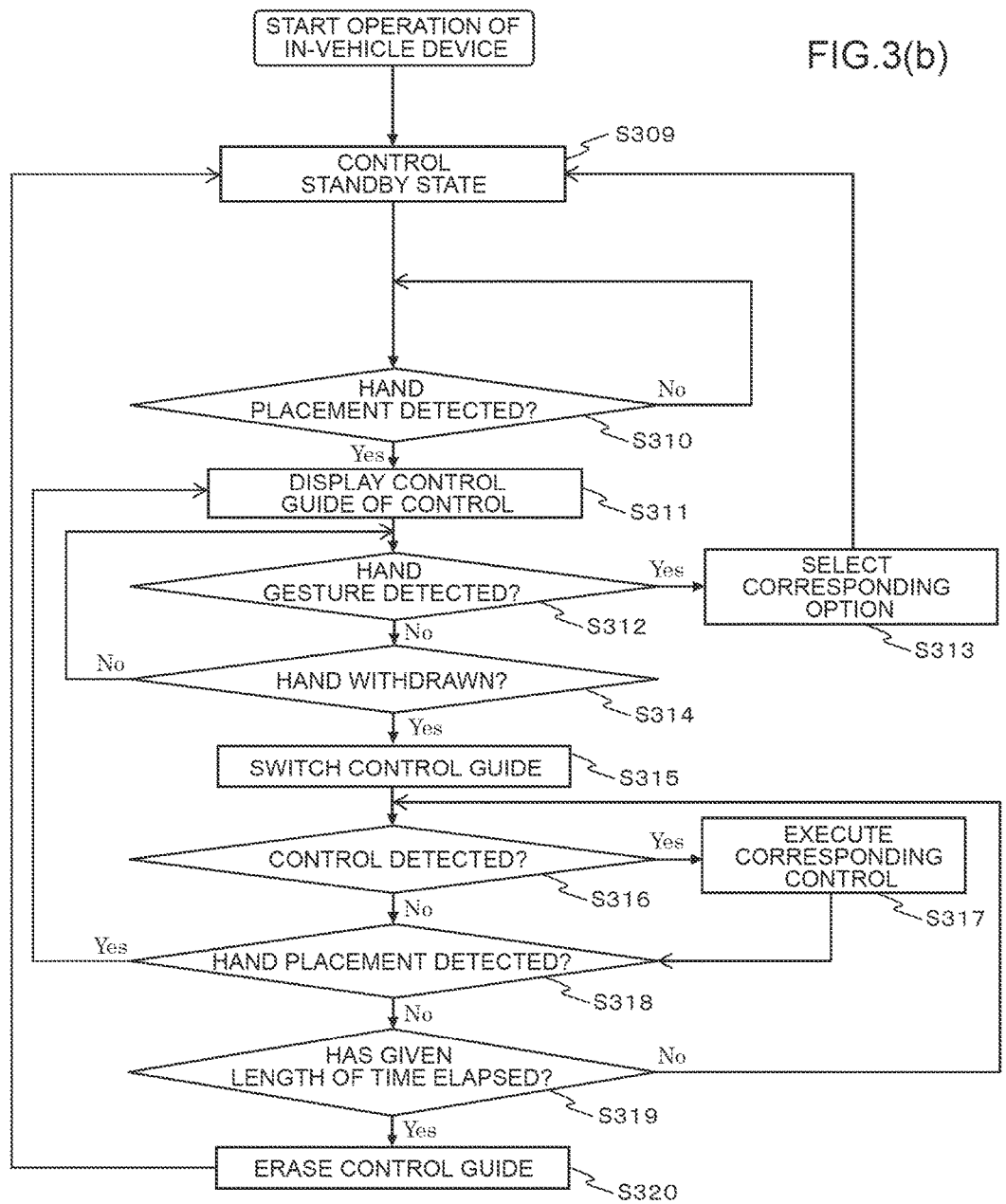
FIG. 3(b) shows an example of an operation flow in the first embodiment.

Embodiments of the present invention are now explained in detail with reference to the appended drawings.
[Embodiment 1]
<<Explanation of Configuration>>

FIG. 1 is a configuration diagram of an in-vehicle device 101 in this embodiment. An in-vehicle device control unit 102 is the part that controls the overall operation of the in-vehicle device 101, and realizes the functions as a messenger application 113 and an output information control unit 114 by performing operations according to programs related to the messenger application 113 and the output information control unit 114 stored in a storage unit (not shown). Note that the in-vehicle device 101 may also be loaded with applications other than the messenger application 113 and the output information control unit 114, and these programs may also be stored in a storage unit at the time of factory shipment, or may be stored in the storage unit through the user's selection via a communication unit 107, or via an externally connected IF (not shown) such as a USB terminal. Moreover, the in-vehicle device control unit 102 controls the basic operation as a car navigation system, and additionally controls the contents to be output based on the various types of input information.

A sensing unit 103 is the part that detects the distance between the user's hand and a sensor, and detects the waving (or moving) of the user's hand, and is configured, for example, from a sensor such as an infrared distance sensor, a laser distance sensor, an ultrasonic distance sensor, a distance image sensor, an electrolytic sensor, or an image sensor, a microcomputer which performs data processing, and software that runs on the microcomputer. There is no particular limitation regarding the sensors to be used in the sensing unit 103, and any sensor may be used so as long as it has a function of being able to obtain a signal for detecting the distance to the user's hand and detecting the waving of the user's hand.

Based on the sensor data obtained from the sensing unit 103, a gesture detection unit 104 detects whether the user placed one's hand at a certain position, and whether a predetermined gesture (for instance, hand waving motion in a vertical/horizontal direction) was performed. For example, the user's hand placement is detected by analyzing whether a predetermined sensor value has continued for a given length of time, and the gesture operation is detected by analyzing the difference between the response times of the hand detection results between a plurality of sensors.

A switch control unit 105 is a hardware switch for controlling the in-vehicle device, and may be a button-pressing type, or a jog-dial type.

A touch control unit 106 sends the touched coordinates to the in-vehicle device control unit 102, and controls the in-vehicle device.

A microphone 115 acquires sounds within the vehicle.

A voice recognition unit 116 converts the speech from the input sound data into a text code string.

A communication unit 107 is connected to an outside network, and inputs/outputs various types of information. For example, the communication unit 107 inputs navigation-related information and sends/receives messages.

An external switch control unit 117 is a switch control unit installed at a location that is different from the location of the in-vehicle device 101, and considered may be a steering switch mounted near the steering wheel, or a commander switch mounted on the center console of the vehicle.

A display unit 108 is a device for presenting video information to the user, and, for instance, is a device comprising a display device such as an LCD (Liquid Crystal Display), and an arithmetic processing device and a memory which are required for the display processing of video contents and GUI (Graphical User Interface).

An external display unit 109 is a display that is installed at a location within the vehicle which is different from the location of the in-vehicle device 101 and displays videos. For example, the external display unit 109 may be a head up display (HUD) mounted at the anterior of the driver's seat. An HUD can display various types of information while allowing the scenery ahead of the driver (user) to pass therethrough. A sound output unit 110 is the part that outputs sounds or voices. A speaker 111 outputs sound from the sound output unit 110.

A tactile IF output unit 112 is the part that conveys some type of tactile information to the user, and, for instance, is configured from an ultrasonic array formed from a plurality of ultrasonic elements, and conveys the spatial pressure of an arbitrary distance of the device. Otherwise, an air blower may be provided to yield the same effect. Moreover, the tactile IF output unit 112 may also be configured from an oscillator mounted near the steering wheel to cause the entire steering wheel to vibrate, and there is no particular limitation regarding the constituent elements.

A messenger application 113 sends and receives messages to and from the communication unit 107, stores the input messages, and outputs such messages. Moreover, when sending a message, the messenger application 113 sends the outbound message to the communication unit 107.

An output information control unit 114 controls the contents to be output to the display unit 108 or the external display unit 109.

FIG. 2(a) shows an installation example of the sensing unit 103. The sensing unit 103 is mounted on the driver's side in a right-side steering wheel vehicle relative to the display unit 108, and can detect the distance information of an object from the spot of the sensor element, and the movement of the object. Consequently, as shown in the lower diagram of FIG. 2(a), the space between the in-vehicle device 101 and the user is divided into a plurality of areas, and in which area the user's hand exists can be detected in detail. As shown in the lower diagram, the space is divided into an area 201 that is close to the sensor position, and an area 202 that is even closer to the sensor position. Note that the number of sensor elements, installation position, and areas to be detected are not limited to this example.

<<Main Operation Flow>>

The operation of the in-vehicle device 101 is now explained in detail with reference to the operation flow shown in FIG. 3(a). Note that, when the messenger application 113 is to output videos or voices to output units such as the display unit 108, the external display unit 109, and the speaker 111, the messenger application 113 sends video or voice information to the output information control unit 114, and the output information control unit 114 determines whether or not to output the received information to the foregoing output units. However, in order to simplify the ensuing explanation, expressions such as "the messenger application 113 outputs videos to the display unit 108" and "the messenger application 113 outputs voices" will be used.

Figure 4A:
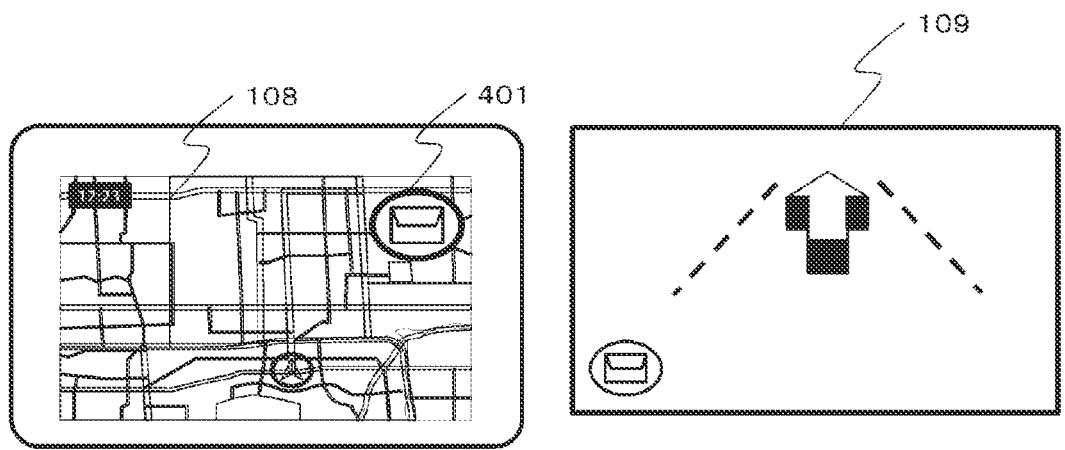
FIG. 4(a) shows a display example of a display unit and an external display unit.

Foremost, the operation of the in-vehicle device 1 is started when the engine of the vehicle is started. The output information control unit 114 displays a navigation screen and an icon 401 of the messenger application 113 on the display unit 108 (center display in this example) as shown in FIG. 4(a) when the operation is started. The messenger application 113 is executed in the background by the in-vehicle device control unit 102 together with the activation of the in-vehicle device 101, and is activated by the output information control unit 114 when the touch control unit 106 detects a touch control of touching the icon 401, or the gesture detection unit 104 detects the user's prescribed gesture operation (for instance, hand waving in the leftward direction in front of the sensor).

Figure 4B:
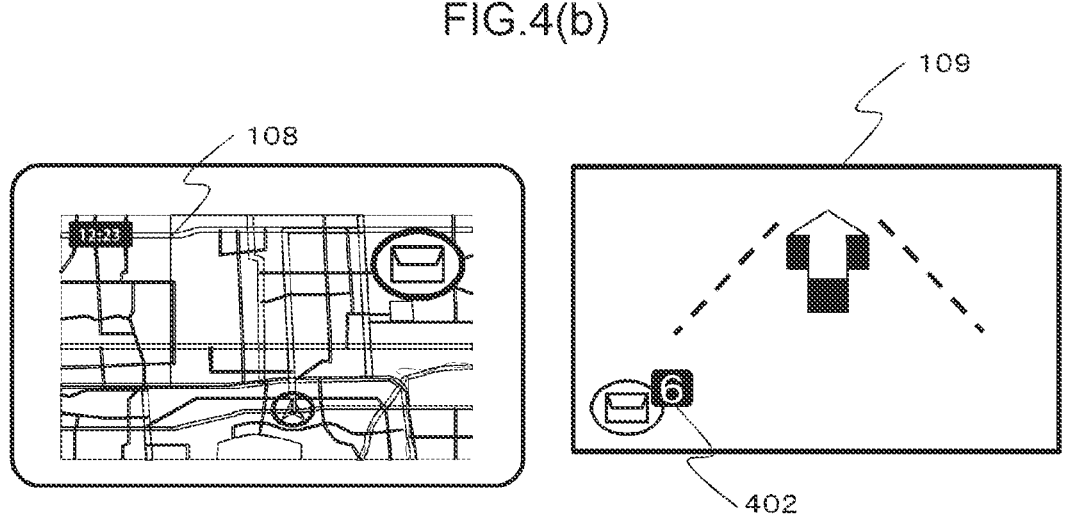
FIG. 4(b) shows a display example of a display unit and an external display unit.

Moreover, the output information control unit 114 displays a navigation screen and a screen related to the messenger application 113 on the external display unit 109 (HUD in this example) when the operation is started. When a message is received from the outside via the communication unit 107 (S301), the messenger application 113 outputs a sound effect to notify an incoming message, displays the total number of received messages on the external display unit 109 as shown with an icon 402 of FIG. 4(b), and notifies the user that the number of unread messages has increased.

Figure 4C:
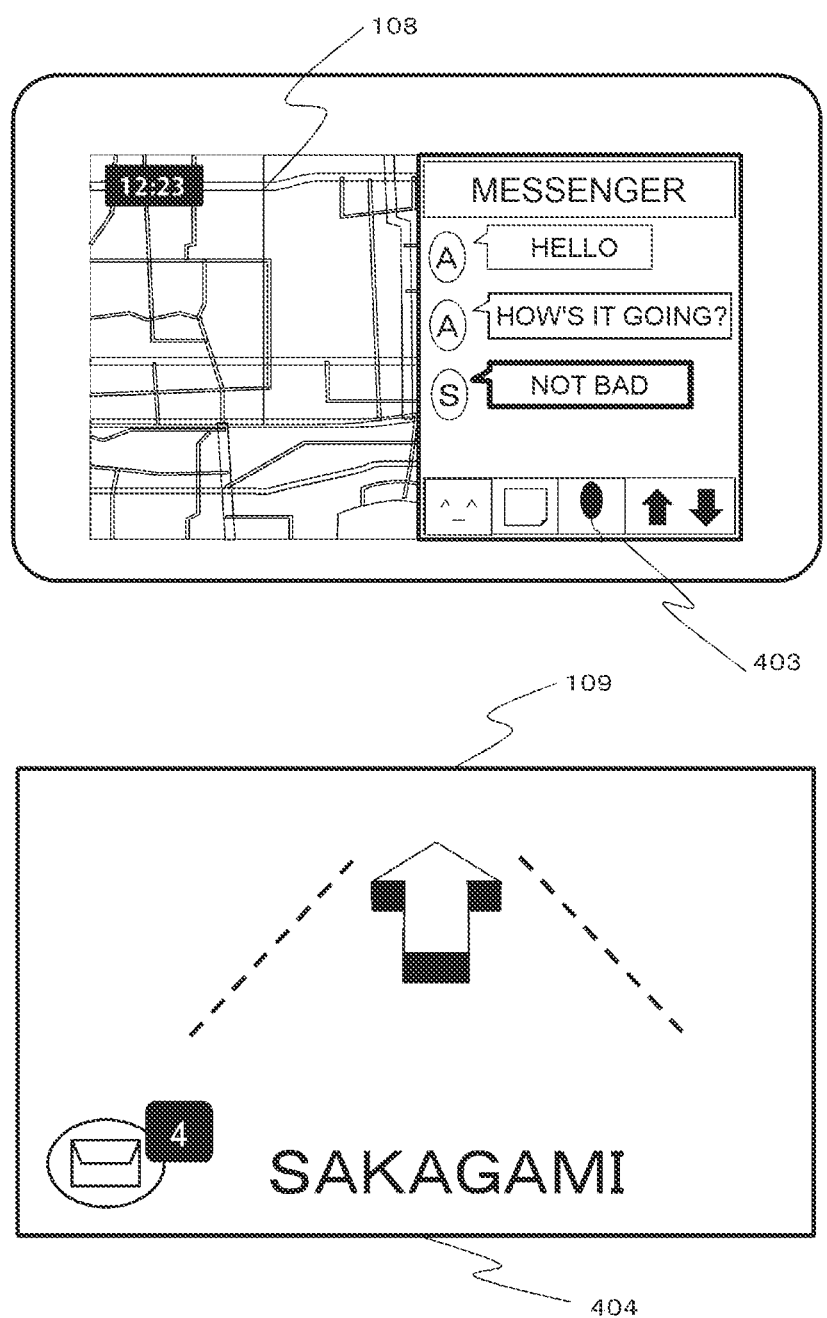
FIG. 4(c) shows a display example of a display unit and an external display unit.

When the gesture detection unit 104, the voice recognition unit 116, the switch control unit 105, the external switch control unit 117, or the touch control unit 106 subsequently detects that the user performed a control for activating the messenger application 113 (S303), the output information control unit 114 switches the display to a screen for using the application by activating the messenger application 113 as shown in FIG. 4(c) (S304). The messenger application 113 thereafter outputs voice information which reads the received messages in order from the oldest message (S305). FIG. 4(c) is a display example when using the half screen of the display unit 108 as the screen of the messenger application 113.

When the touch control unit 106 detects that the user touched an area of an icon 403 on FIG. 4(c), the messenger application 113 causes the display unit 108 to display a screen for performing the respective controls of stamp reply, fixed phrase reply, free speech reply, and message return/forward from the left side of the area of the icon 403. Moreover, while the voice information is being output in S305, the messenger application 113 causes the external display unit 109 to display the current number of unread messages as with an icon 404 in the lower diagram of FIG. 4(c), and the name of the sender of the message that is being read. When the gesture detection unit 104 detects that the user performed a prescribed gesture operation (for instance, hand waving motion in an upward or downward direction) while the message is being read (S306: Yes), the messenger application 113 causes the speaker 111 to output voice information so that the latest message among the unread messages is read (S308).

Figure 5A:
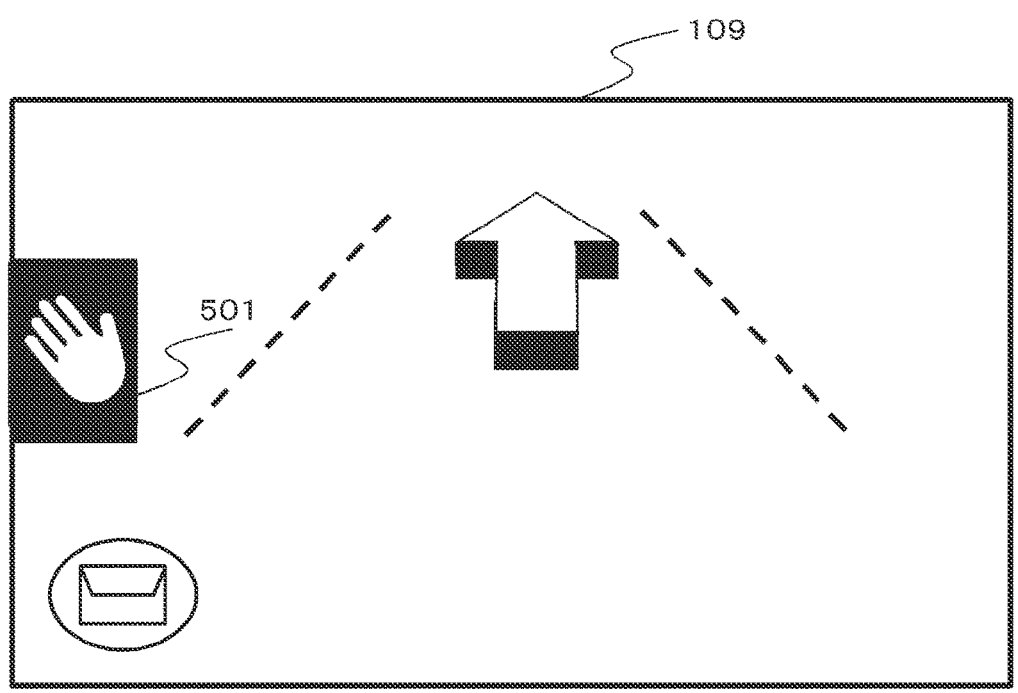
FIG. 5(a) shows a display example of an external display unit.

When no such gesture operation is detected, the messenger application 113 continues to output the voice information so that the unread messages are read in order from the oldest message (S307), and, when the reading of the latest message is finished, enters a reply control standby state while causing the display unit 108 and the external display unit 109 to continue displaying the last sender as shown in FIG. 4(d) (S309). In the reply control standby state, the messenger application 113 displays an icon 501, which indicates that a gesture-based reply control can be performed, on the external display unit 109 as shown in FIG. 5(a).

Figure 5B:
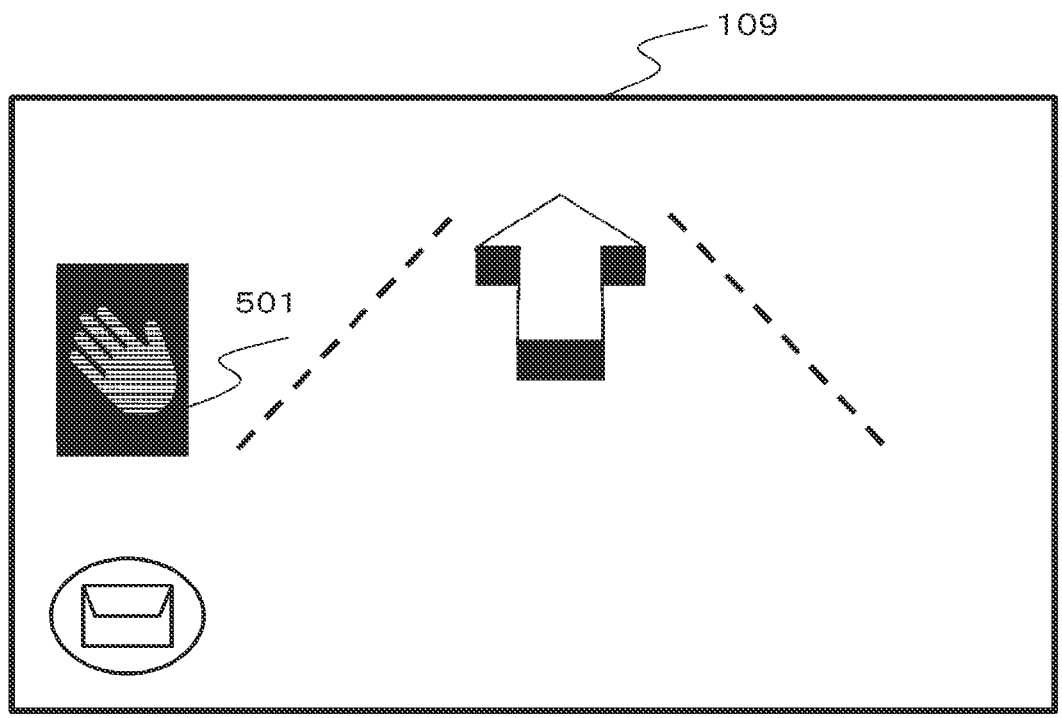
FIG. 5(b) shows a display example of an external display unit.

When a given length of time (for instance, 0.5 seconds) has elapsed in a state where the user's hand is placed in the area 202 of FIG. 2(a) (S310: Yes), it is determined that the conditions for starting the control have been satisfied, and the external display unit 109 switches its screen such that the menu as the control guide of the reply control will be displayed in a manner of sliding from the right side of the screen, and a sound effect to notify the appearance of the menu is also output (S311). Note that, when the user's hand is detected in the area 202, the messenger application 113 may also output a sound effect for allowing the user to aurally recognize such detection, and move the icon 501 to the right side or change the color of the icon as shown in FIG. 5(b) for allowing the user to also visually recognize such detection. Moreover, when the user's hand is detected in the area 201 and not in the area 202 and a given length of time (for instance, 0.3 seconds) has elapsed, the messenger application 113 outputs a sound effect to notify the user that the hand placement position is erroneous. By this means, when placing one's hand, the user can perform hand placement controls while looking ahead without having to shift one's line of sight to his/her hand.

FIG. 2(b) and FIG. 2(c) are diagrams showing in detail the relation of the detection state of the user's hand and the output of sound effects. FIG. 2(b) and FIG. 2(c) respectively represent the time axis and the sensor value of the sensing unit 103, and show the boundary for determining whether the sensor value falls within the area 201 or the area 202.

FIG. 2(b) shows an example where the user stretches one's hand toward the area 202, and places one's hand in the area 202 for a given length of time. When the gesture detection unit 104 detects that the user's hand entered the area 201, the gesture detection unit 104 outputs a sound effect 1. Next, when the gesture detection unit 104 detects that the user's hand entered the area 202, the gesture detection unit 104 outputs a sound effect 2. When the gesture detection unit 104 continues to detect that the user's hand is in the area 202 for a time T1 or longer (for instance, for 0.5 seconds or longer), the gesture detection unit 104 outputs a sound effect 3, and switches the screen of the external display unit 109 as explained with reference to S311.

FIG. 2(c) shows an example where the user continues to place one's hand in the area 201. The gesture detection unit 104 outputs the sound effect 1 upon detecting that the user's hand entered the area 201, and outputs a sound effect 4 upon detecting that the user's hand is in the area 201 for a time T2 or longer (for instance, for 0.3 seconds or longer). If the user's hand is subsequently detected in the area 202, the same process as the example of FIG. 2(b) is performed. In the ensuing explanation, the control of placing one's hand in the area 202 for the time T1 or longer is sometimes simply referred to as "hand placement".

Figure 5C:
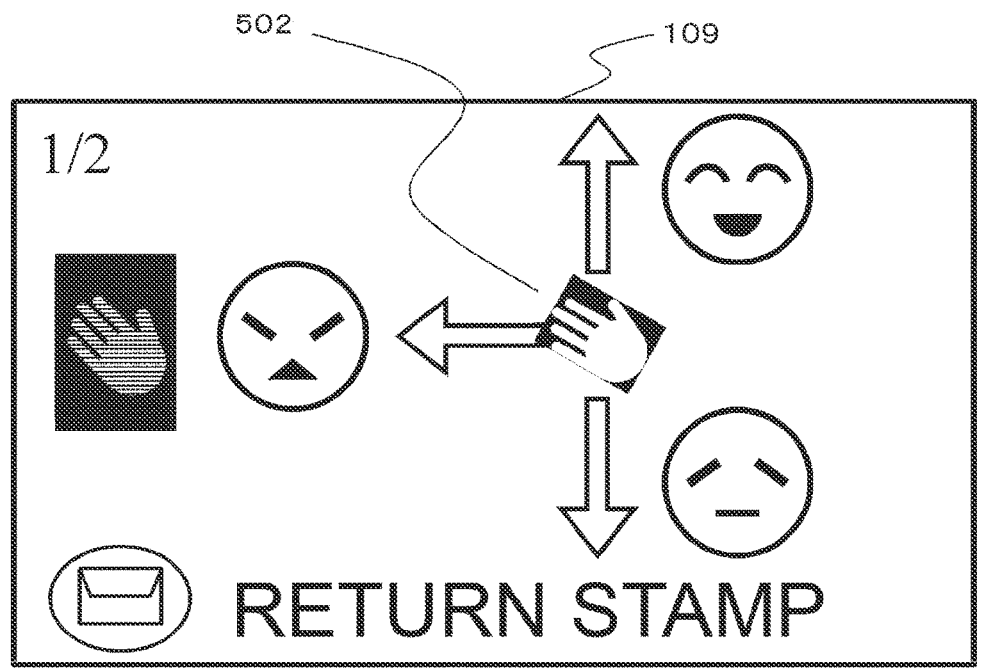
FIG. 5(c) shows a display example of an external display unit.

FIG. 5(c) shows an example of a case where a control menu, which enables the user to perform a stamp reply, is displayed. The icon 502 is a control guide which means that, when the user performs a gesture in the upward, leftward or downward direction while placing one's hand over the icon 502, the corresponding stamp can be selected. Moreover, the display of 1/2 at the upper left corner refers to the total number of pages of the displayed stamp candidates, and the current page. When a gesture in the upward, leftward or downward direction is detected in this state (S312: Yes), the messenger application 113 selects the stamp corresponding to that direction and sends a reply (S313), and then once again makes a transition to the reply control standby state S309.

When no gesture is detected and the user's hand leaves the area 202 (S312: No, S314: Yes), the displayed contents of the external display unit 109 are switched to the displayed contents shown in FIG. 5(d) (S315). The icon 503 represents the stamp candidates that can currently be selected. The icon 504 represents that the corresponding control will be performed when the gesture control corresponding to the displayed direction (upward hand waving or downward hand waving) is performed. Moreover, the display of "fixed phrase" means switching the reply method to a fixed phrase reply, and the display of "next page" means switching the stamp candidates from those displayed with the icon 503 to the next candidate group. If numerous options are displayed at once, the user will spend too much time selecting the option despite the user driving a vehicle, and may lead to the user's lack of concentration in driving the vehicle. Thus, in this embodiment, only the 3 options positioned at the top, left and bottom are provided, and, by providing gestures for increasing the options of the stamp to be sent, more than 3 options can be provided to the user. When a corresponding gesture control is detected (S316: Yes), a corresponding control is executed (S317). When a gesture is not detected (S316: No) and the placement of the user's hand in the area 202 is detected (S318: Yes), the messenger application 113 makes a transition to the state of S311, and once again enters the stamp selection state.

When the user's hand is not detected and a given period of time (for instance, 10 seconds) elapses in that state (S318: No, S319: Yes), the messenger application 113 erases the control guide from the screen of the external display unit 109, and makes a transition to the reply control standby state of S309 (S320). When a reply is sent, as shown in FIG. 6, the messenger application 113 displays the contents of the reply control result (selected stamp in this example) on the display unit 108, displays the name of the user who sent the reply on the external display unit 109, and reads the reply message.

Note that this operation flow is an explanation of a representative example of the operation of the in-vehicle device 101 of the present invention, and the operation, display, and sound effect are not limited to this example. For example, while the foregoing explanation was provided by assuming the sending of a reply when using the messenger application 113, the present invention is not limited thereto, and can be applied to the overall control of the in-vehicle device control unit 102 of selecting a plurality of options. FIG. 3(b) shows a simplified version of the operation flow. The basic operation is as explained above, and, while the explanation of the operation in each step is the same as those with the same step number of FIG. 3(a), S316 of FIG. 3(b) does not have to be limited to vertical hand waving, and may also accept various controls, such as the control using a steering switch.

Moreover, when a message is received from the outside, the configuration may also be such that the message is read at the same time that the message is received, or the contents of the received message may be displayed on the external display unit 109. Consequently, it will be easier for the user to comprehend the message. Moreover, the configuration may also be such that at the reply control standby it can be accepted at any time without waiting for the reading of the latest message to be finished. Consequently, the user may send a reply at any time. Moreover, with regard to the area 202 where the user's hand is to be placed, the configuration may be such that the tactile sensation is presented in mid air in such area by the tactile IF unit 112.

For example, the configuration may be such that the pressure points of an ultrasonic device array appear on the boundary of the areas, or a tactile sensation is given on the vertical line of the area using an air blower. Consequently, the user can place one's hand in the area while looking straight ahead, and can send a reply safely even though such control is performed while driving. Moreover, while the transition is made to the stamp reply control after the user's hand placement is detected in this example, the configuration may also be such that the transition is made to the reply method selection state (stamp, fixed phrase, free speech or the like) before the foregoing transition. Consequently, the user can select one's preferred reply method at the time that the reply control is started.

Moreover, while the user's gesture is accepted after the user's hand placement is detected and the control guide is displayed on the external display unit 109 in this example, the user's gesture may also be accepted from a given length of time before (for instance, 0.2 seconds before) displaying the control guide. Consequently, once the user becomes familiar with the control and learns which gesture corresponds to which control, the control can be performed without having to display unnecessary screens on the external display unit 109, and the control time can also be shortened.

Moreover, in S319, while the lapse of a given length of time was measured, the configuration may also be such that the process proceeds to S320 upon detecting a predetermined control (for instance, hand waving motion in the left direction, switch control, or the like) prior to satisfying the foregoing condition. Consequently, the user can switch the display of the external display unit 109 to a navigation screen at one's desired timing.

Figure 7A:
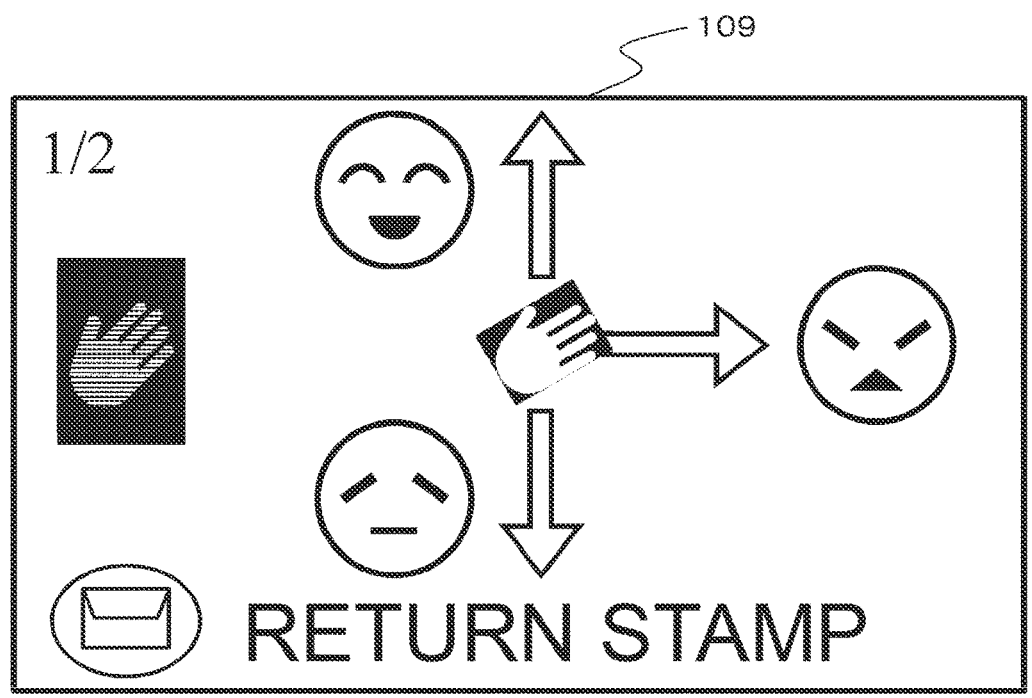
FIG. 7(a) shows a display example of an external display unit.
Figure 7B:
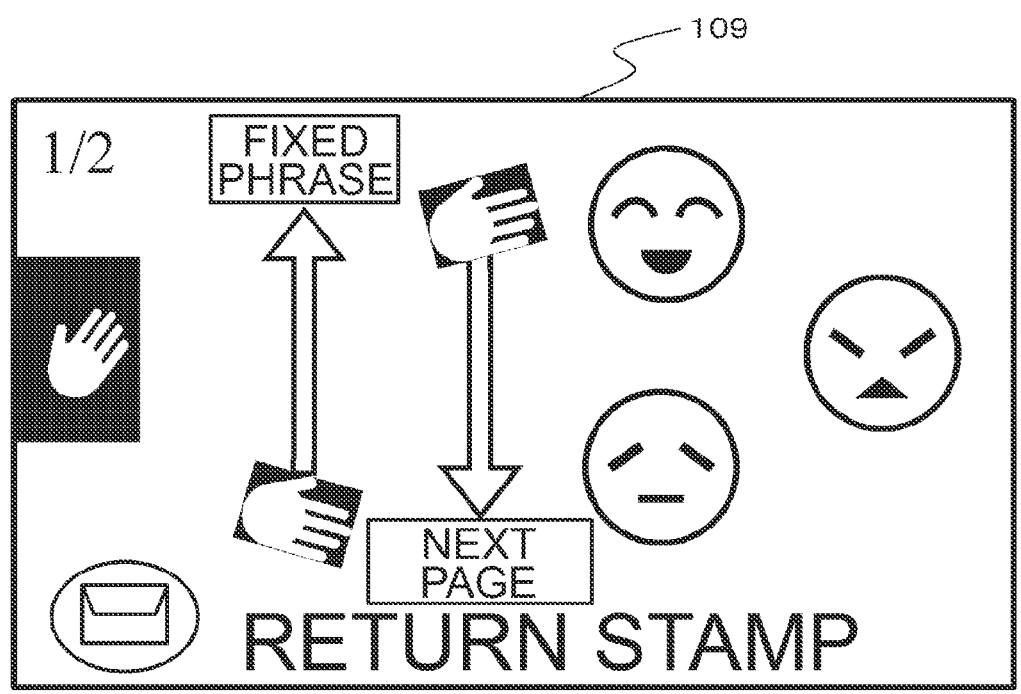
FIG. 7(b) shows a display example of an external display unit.

Moreover, the control guide displayed on the external display unit 109 and the gesture direction are not limited to 3 directions, and arbitrary directions and number of directions may be used. Here, directions in which the gesture control can be easily performed while sitting in the driver's seat may be set. For example, if the user's gesture is made in the direction of the steering wheel, the user's hand may hit the steering wheel while driving the vehicle and, therefore, a gesture in such direction is excluded as an option. Thus, the configuration may be such that whether the steering wheel of the vehicle to be driven is a right-side steering wheel or a left-side steering wheel can be set in advance using the setting screen and, when the steering wheel is a left-side steering wheel, the control guide displayed on the external display unit 109 indicates the 3 directions of upward, downward and rightward as shown in FIG. 7(*a*) and FIG. 7(*b*). Note that FIG. 7(*a*) and FIG. 7(*b*) correspond to FIG. 5(*c*) and FIG. 5(*d*), respectively.

Moreover, because the hand to be used for the gesture will change depending on the location where the steering wheel is mounted, the display and direction of the icons are also changed. Furthermore, because the visibility of the various icons will change depending on the position of the steering wheel, the use may also individually change the setting. Consequently, the user can perform controls based on gestures that can be easily performed according to the steering wheel installation position for each vehicle model, and the user can effortlessly perform various controls based on gestures while sitting in the driver's seat.

Figure 8A:
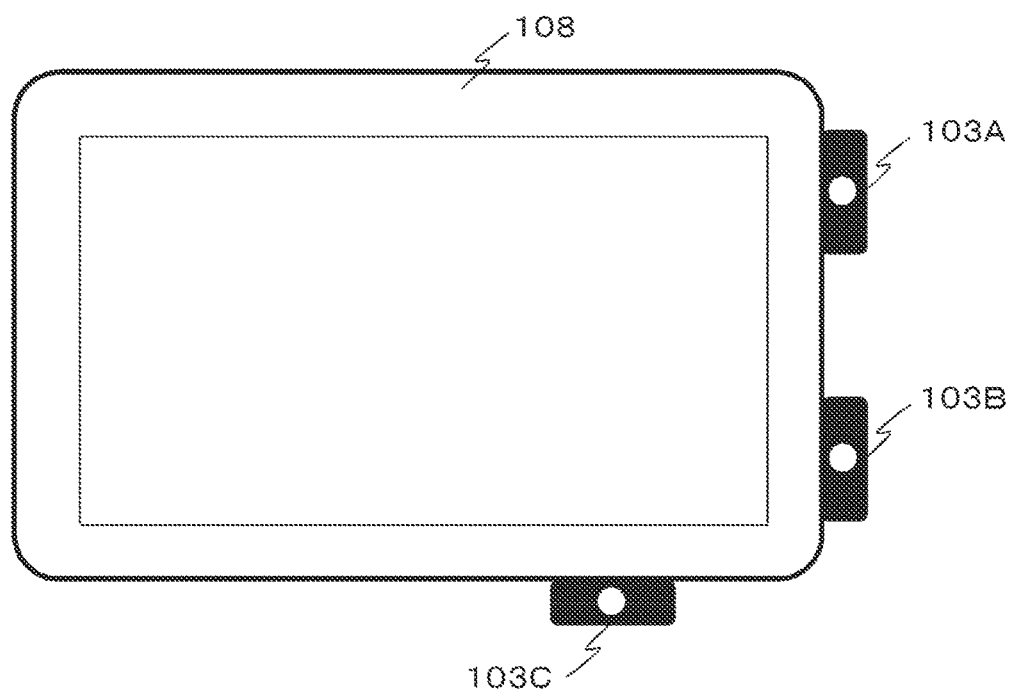
FIG. 8(a) shows an installation example of a sensing unit.

Moreover, the configuration may also be such that the placement of the user's hand can be performed at a plurality of locations, without limiting the hand placement position to one location as in this example. For example, as shown in FIG. 8(*a*), three sensors are installed at three locations. Here, the reply method may be decided depending on which sensor detected the user's hand placement. As shown in FIG. 8(*b*), a stamp reply is sent when the sensor 103A detects the user's hand placement, a fixed phrase reply is sent when the sensor 103B detects the user's hand placement, and a free speech reply is sent when the sensor 103C detects the user's hand placement. Consequently, the user can quickly select the reply method and perform the reply control. The user may also designate in advance which sensor corresponds to which method.

Moreover, the configuration may also be such that a camera is used for the sensing unit 103 as shown in FIG. 9 to detect the approach and gesture of the user's hand. The images of predetermined hand shapes are learned in advance, and the user's hand placement is detected from the pattern recognition of the learned data, irrespective of the distance and position of the user's hand. Here, a plurality of hand shapes may be detected during the user's hand placement (901A to 903C), and the reply method may thereby be selected. Consequently, the user will be able to start the reply control without reaching out one's hand in front of the sensing unit 103 and performing any gesture operation.

Figure 10A:
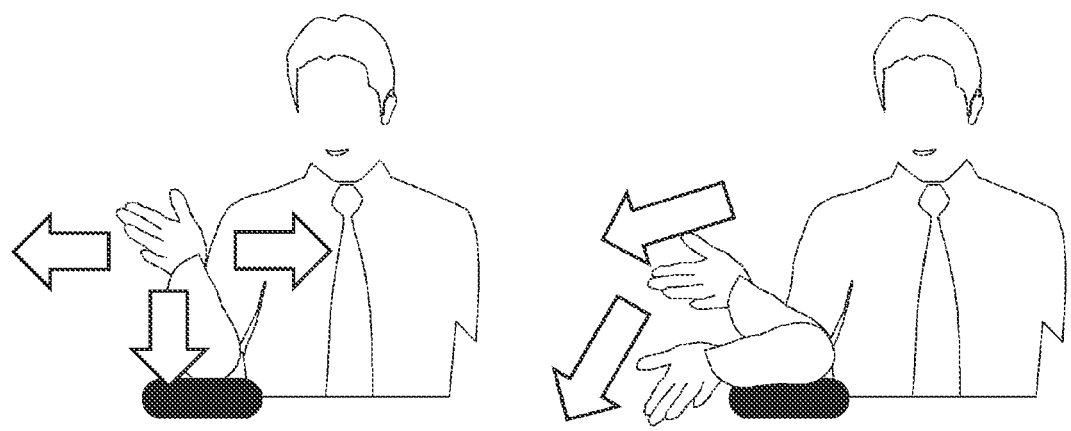
FIG. 10(a) shows examples of the manner of waving a user's hand.
Figure 10B:
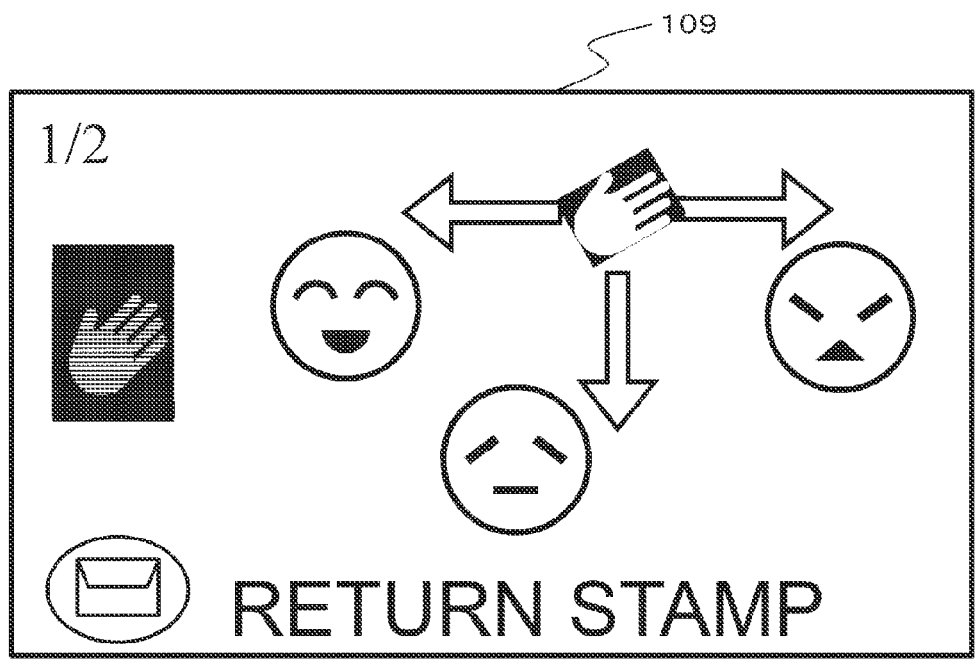
FIG. 10(b) shows a display example of an external display unit.

Furthermore, the configuration may also be such that the direction and number of gestures to be accepted are changed according to the position and posture of the user's hand upon detecting the user's hand placement. For example, as shown in FIG. 10(*a*), in a state where the user is placing one's elbow on an elbow rest and raising one's hand, when the user's hand placement is detected, gestures in the leftward, downward and rightward directions are recognized as shown in FIG. 10(*b*). This is because, in the user's posture described above, it would be difficult for the user to make a gesture in the upward direction and, therefore, gestures in the 3 directions of leftward, downward and rightward are recognized. Furthermore, the configuration may also be such that the user can set in advance which gestures are to be recognized. Consequently, the user can perform gesture controls based on unrestricted postures.

Figure 11A:
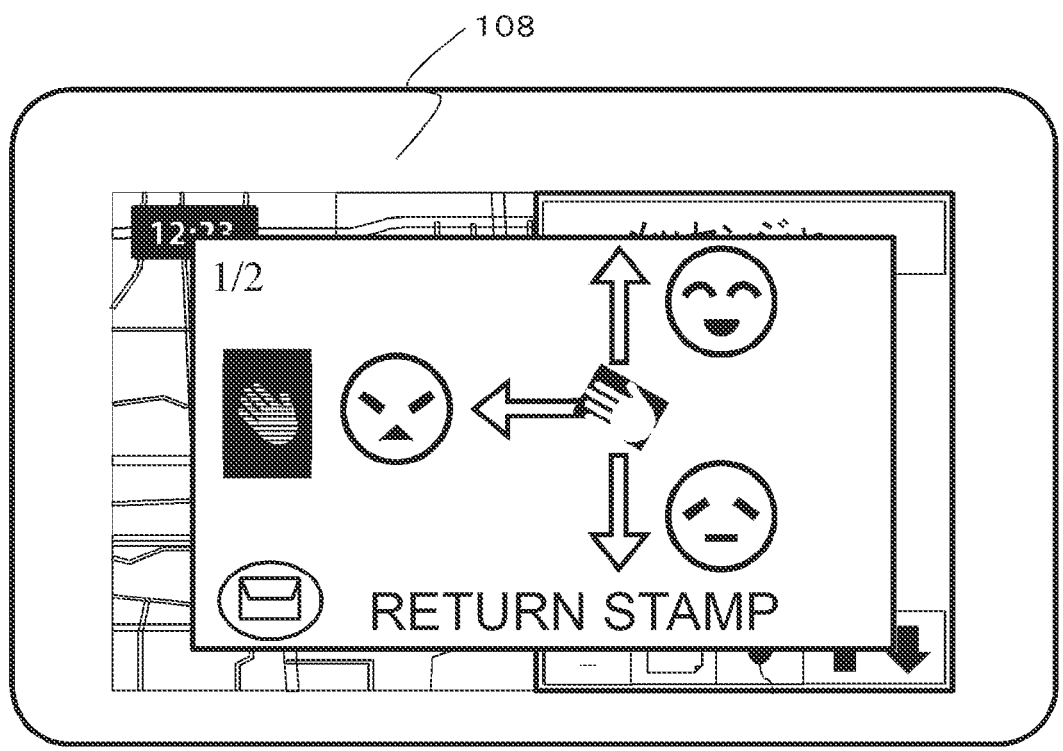
FIG. 11(a) shows a display example of a display unit.

Moreover, while the control menu of the reply control is displayed on the external display unit 109 in this example, the configuration may also be such that the location of display and the displayed contents are changed according to the connection status or the installation position of the various devices. For example, when the HUD is not connected, the gesture control guide is displayed at the center of the screen as shown in FIG. 11(*a*). Here, as shown in FIG. 11(*b*), the processing of managing the installation position and the connection status of a plurality of displays and deciding the priority is performed. While the basic rule is to display the control guide on the display with the highest priority, in cases where the HUD cannot be used due to a malfunction or other reasons, the control guide is displayed on the display of the next highest priority. Here, the time of displaying the guide may be shortened or the amount of information to be displayed may be reduced according to the priority. The priority may be set based on various methods; for instance, the priority may be set at the time of factory shipment or time of sales, set by the user with a setting screen (not shown), or programmed in the in-vehicle terminal so that the priority is determined from the characteristics of the display that is connected to the in-vehicle terminal.

Furthermore, when a carry-in external device (smartphone or the like) is connected to the in-vehicle device 101 as shown in FIG. 11(*c*), the configuration may also be such that the priority is increased according to the installation position. Consequently, when a device such as the HUD to display the control guide cannot be used, the control guide can be displayed on a substitute device to enable the user to perform controls.

Moreover, in the reply control of S311 onward in FIG. 3(*a*) or FIG. 3(*b*), the configuration may also be such that other control means (voice recognition control, switch control or the like) capable of controlling the in-vehicle device 101 may also be used without limitation to the gesture control. FIG. 12(*a*) shows the operation flow in the foregoing case. After the step of S316, when a preparatory movement of the user attempting to perform certain control means is detected (S1201: Yes), the control guide corresponding to such operation is displayed on the external display unit 109 (S1202). Subsequently, when the selection control is executed (S1203: Yes), a reply based on the selected option is performed (S1204). Specifically, upon making a transition to the state of S315, the control guide as shown in FIG. 12(*b*) is displayed on the external display unit 109. An icon 1201 shows that the upper icon can be used for selecting the option of gesture, the middle icon can be used for selecting the option of voice recognition, and the lower icon can be used for selecting the option of switch, respectively.

Figure 12A:
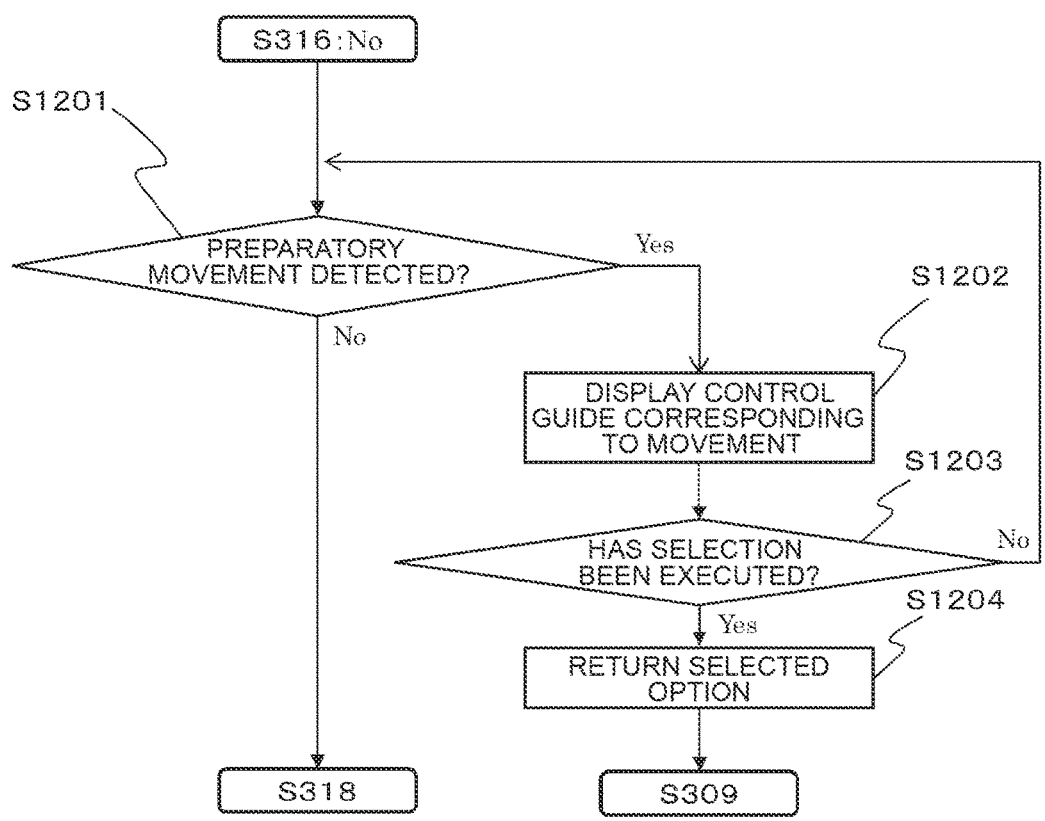
FIG. 12(a) shows an example of an operation flow.
Figure 12B:
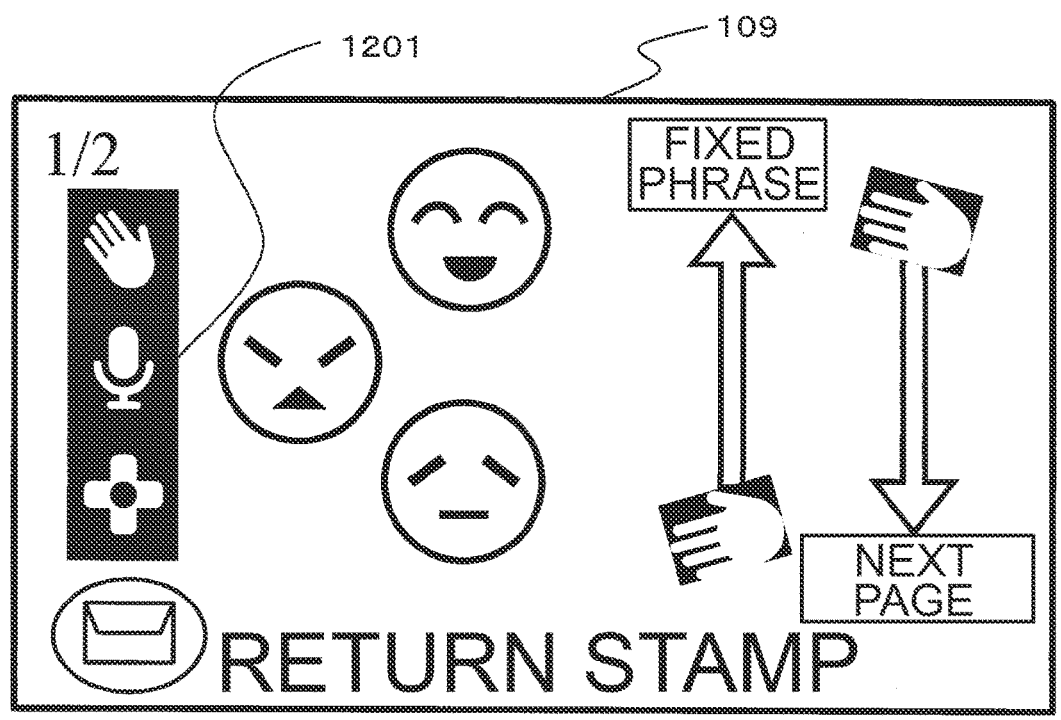
FIG. 12(b) shows a display example of an external display unit.
Figure 12C:
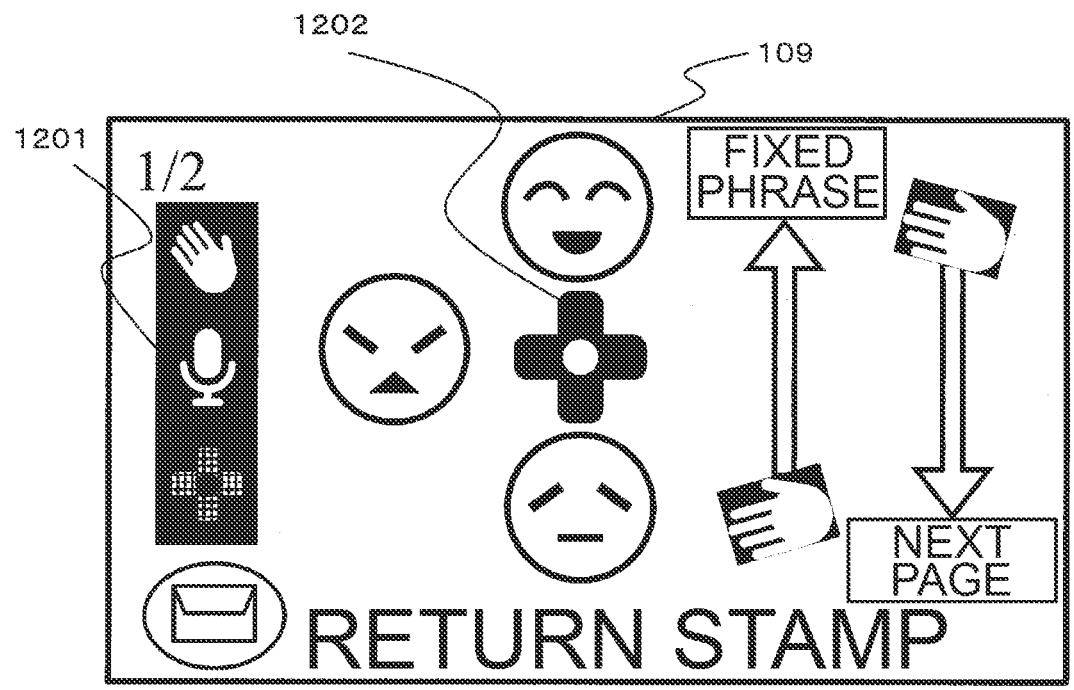
FIG. 12(c) shows a display example of an external display unit.

When it is detected that the user will perform a steering controller control (for instance, an arbitrary button of the steering switch is pressed once, or a contact sensor is mounted on the switch surface and a response thereof is obtained), the display switches to the screen as shown in FIG. 12(c). The icon 1201 notifies the user that the steering controller control is active by changing the color of the icon. The display 1202 shows the candidates of stamps corresponding to the respective buttons of the steering controller. A reply control based on the corresponding stamp is performed according to the pressed button of the steering controller. Note that the display returns to the screen of FIG. 12(b) when a given length of time elapses, or the contact sensor of the steering controller is no longer responding.

Figure 12D:
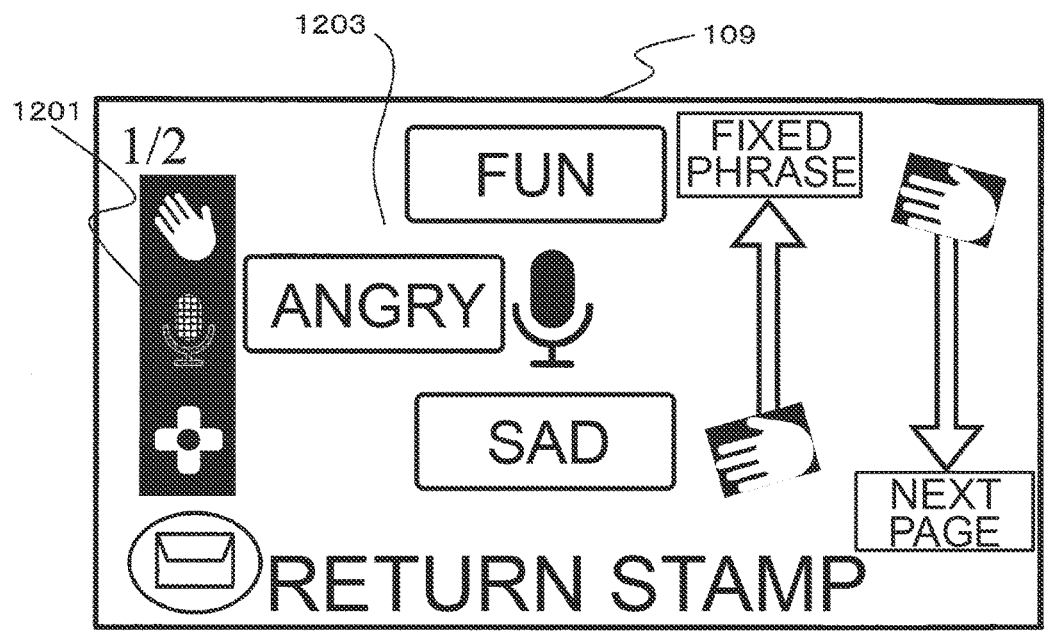
FIG. 12(d) shows a display example of an external display unit.

Meanwhile, when it is detected that the user will perform voice recognition (for instance, a voice recognition start switch is pressed), the display switches to the screen as shown in FIG. 12(d). The icon 1201 shows that the voice recognition is in a standby state, and the display 1203 shows that, by speaking words corresponding to the respective messages, the corresponding stamp can be selected. When the result of voice recognition coincides with one of the options, a reply control of the corresponding stamp is performed. In the example of FIG. 12(d), while only messages such as "I'm having fun" corresponding to the icon are displayed, the icon to be sent may also be displayed alongside the message so that user can know, at a glance, which icon will be sent. When voice recognition is used, because the user can select the stamp to be sent without removing one's hand from the steering wheel, this will further contribute to safe driving.

Note that the three types of control means can be switched even midway during their controls if a start trigger of the respective controls is detected. Moreover, in a control state based on switch control and voice recognition, a gesture control based on a vertical hand waving in such state is also accepted. Consequently, when the user is to send a reply, the user is not limited to a single control means, and may freely select the control means for performing the reply control according to the driving status, or according to the user's preference. Moreover, upon switching the respective control means, by presenting to the user which control means is currently operable and how to perform such control, the user can quickly perform the control intuitively without any hesitation.

Figure 12E:
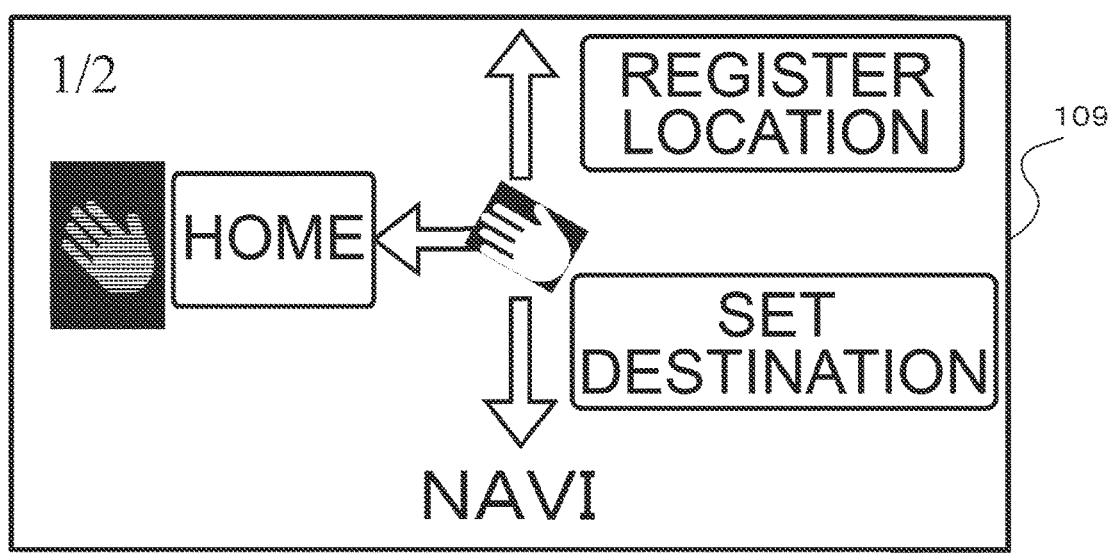
FIG. 12(e) shows a display example of an external display unit.
Figure 12F:
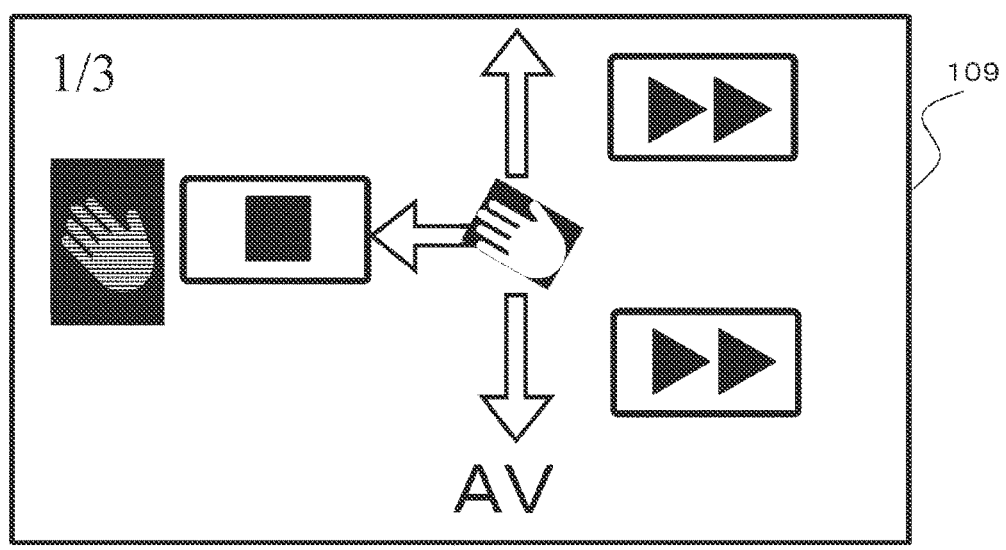
FIG. 12(f) shows a display example of an external display unit.

Moreover, the configuration may also be such that the control contents that can be performed when the user places one's hand are changed according to the operation status of the application being controlled by the in-vehicle device 101. FIG. 12(e) shows an example of presenting, as navigation-related controls as the available choices, the route setting to the user's home, registration of the current location, and voice-based setting of the destination, when the application running in the background is only a navigation application. FIG. 12(f) shows an example of presenting, as available choices, the control of stopping the music, skipping to the next song, or skipping to the previous song when the user places one's hand during music playback. FIG. 12(g) shows an example of presenting, as available choices, the control of listening to the details of traffic jam information, rerouting to the destination, or changing the destination when the user places one's hand upon receiving traffic jam information or the like. Consequently, the user can quickly select various controls according to the status of application being controlled by the in-vehicle device 101 while the user is driving the vehicle.

Based on the in-vehicle device 101 according to the first embodiment of the present invention described above, the user can, intuitively and quickly, perform controls while looking straight ahead even while driving the vehicle. Specifically, the user can quickly switch the display of the messenger application and perform the control of skipping message while looking straight ahead. Moreover, in cases of controls of selecting a plurality of options, the user can select one's intended option while looking straight ahead and confirming the contents of the available choices. Furthermore, once the user becomes familiar with the controls, the user will be able to select the options without having to view the display, and the user will be able to perform controls more safely and quickly.

[Embodiment 2]

<<Explanation of Configuration>>

FIG. 13 is a configuration diagram of the in-vehicle device 101 in this embodiment. In comparison to the configuration diagram of FIG. 1, a vehicle information input unit 118, a control means control unit 119, a workload estimation unit 120, and a map DB (database) 121 have been added. The vehicle information input unit 118, the control means control unit 119, and the workload estimation unit 120 exhibit the functions as the vehicle information input unit 118, the control means control unit 119, and the workload estimation unit 120 as a result of the in-vehicle device control unit 102 performing operations according to the programs stored in the storage unit (not shown).

The vehicle information input unit 118 is the part that acquires information related to the vehicle that is being driven, and, for instance, is connected to the vehicle via a CAN (Control Area Network), and acquires information related to vehicle speed, accelerator position, brake position, turn signal, and steering angle.

The control means control unit 119 controls to which control the control input from the gesture detection unit 104 or the voice recognition unit 116, or the various switch control units should be reflected.

The workload estimation unit 120 estimates the user's workload in the driving operation. For example, in addition to the various input signals from the vehicle information input unit 118 described above, the workload estimation unit 120 integrates information input from the communication unit 107 (map information, type of road that the vehicle is traveling on, distance to preceding vehicle, and so on), and defines the workload level as four stages (None, Low, Medium, High). "None" is a state where the vehicle is waiting at a traffic light or the vehicle is on autopilot and being driven based on ACC (Adaptive Cruise Control) or the like where the driver is not required to perform any special control, "Low" is a state where the vehicle is being driven on a straight road with no obstacles in the periphery, "Medium" is a state where the vehicle is being driven at a certain speed or faster and a steering wheel control is constantly required, or a state of making a turn at an intersection, and "High" is a state where the user is required to perform an important driving operation to avoid an accident. The map DB 121 is a database which stores map information.

<<Explanation of Operation>>

The operation of the in-vehicle device 101 of this embodiment is now explained in detail. The basic operation is the same as the operation explained in Embodiment 1, but this embodiment is unique in that the operation is controlled according to the output of the workload estimation unit 120. The in-vehicle device control unit 102 has defined in advance the workload level output from the workload estimation unit 120 and the control means that can be controlled and the displayed contents that can be presented, at the respective workload levels. FIG. 14(*a*) to FIG. 14(*d*) show the foregoing definitions.

FIG. 14(*a*) shows whether or not the respective control means can be used in the respective workload levels. When the workload level is "None" or "Low", all control means described in Embodiment 1 can be used for sending a reply. Meanwhile, when the workload level is "High", all controls are prohibited. When the workload is "Medium", the display of the hand placement control guide and the subsequent selection of options based on a gesture control are prohibited. Because a hand placement control is a control means that forces the user to perform one-handed driving, this control is prohibited in circumstances where the user should concentrate on the driving operation.

Figure 15A:
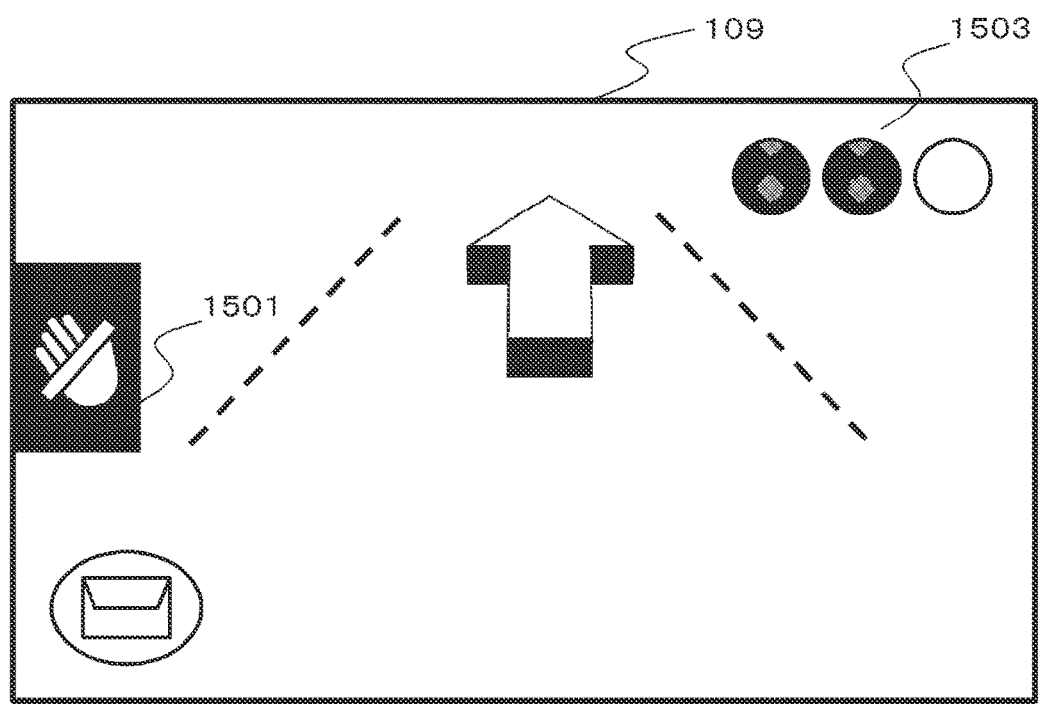
FIG. 15(a) shows a display example of an external display unit.
Figure 15B:
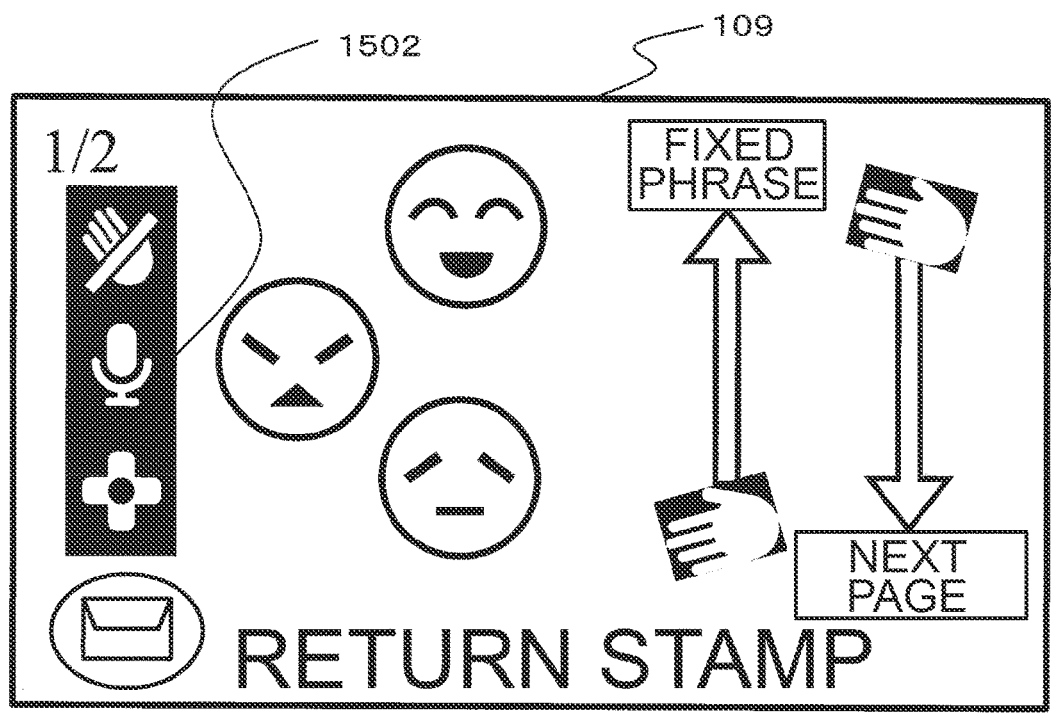
FIG. 15(b) shows a display example of an external display unit.

The external display unit 109 of this embodiment displays the current workload level as shown with the icon 1503 of FIG. 15(*a*). FIG. 15(*a*) shows that the workload level is "Medium", and a display showing that the hand placement control is prohibited, as shown with the icon 1501, is indicated to notify the user that a control using one's hand cannot be performed. Moreover, then the user's hand placement is detected in this state, the display or color of the icon 1501 is changed, and a warning sound or warning message is output, to emphasize the fact that no hand placement control may be performed, and to urge the user to immediately stop his/her hand placement. By performing the foregoing control, the user can comprehend the current workload status, and it is possible to prevent, as much as possible, the user from removing one's hand from the steering wheel for a long time as a result of attempting to display the control guide even though the user is required to perform the steering wheel control. Meanwhile, free speech reply based on voice recognition that does not require the use of a hand and a hand waving gesture that can be completed with an instant control can be used even when the workload level is "Medium".

Furthermore, in cases where the reply control after the user's hand placement in a state where the workload level is "None" or "Low" is still being performed, if the workload level switches to "Medium", the selection control of options based on switch control and voice recognition is permitted only for the foregoing reply control that is still being performed. Here, FIG. 15(*b*) shows that, among the icons of the three types of control means, the selection control based on hand placement and gesture is prohibited.

FIG. 14(*b*) shows the definitions related to the workload level and the output contents of the center display. Foremost, when the workload level is "None", the messenger application 113 displays the entire text of the message. Moreover, when the user is sending a reply based on basic controls such as touching the control icon on the screen, all options such as the stamp candidates are also displayed. When the workload is "Low" or "Medium", the text of the message is not displayed, and only the name of the sender of the message is displayed. Moreover, the control system using a touch control is also not displayed.

Figure 16A:
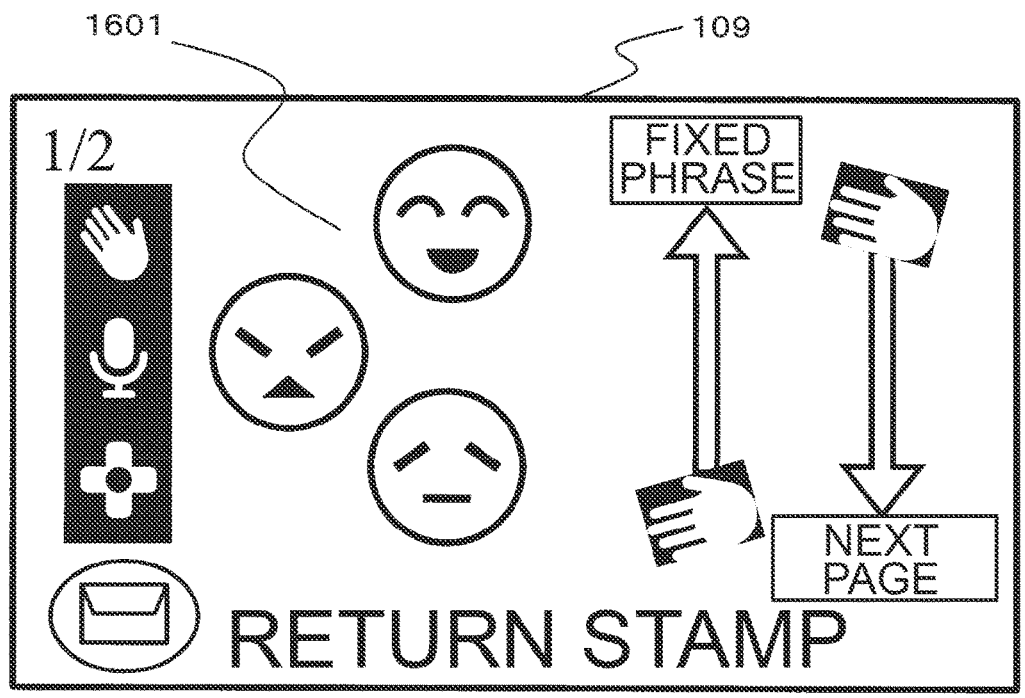
FIG. 16(a) shows a display example of a display unit.

Furthermore, when the workload is "High", the screen of the messenger application 113 is also turned off, and a warning message corresponding to the situation (for instance, "Keep distance!") is displayed. Note that, in cases where the workload is "Low" or "Medium" and the user is sending a reply based on hand placement, if the workload level switches to "None" midway during the foregoing control, the user may also perform such control based on a touch control on the center display in consideration of the status of the control guide displayed on the HUD. For example, as shown in FIG. 16(*a*), in a state where the user is performing a stamp reply on the HUD, information of the contents and arrangement of the stamp candidates is maintained and additionally displayed on the center display as shown in FIG. 16(*b*).

Specifically, in a state where the contents of the stamp candidates 1601 and the arrangement thereof on the screen of the HUD are maintained, the stamp candidates are displayed on the center display as shown with reference numeral 1602. Furthermore, the contents of 1602 are arranged on the driver's side so that it would be easier for the driver to perform controls, and select the stamp to be sent based on a touch control. Moreover, the remaining stamp candidates are arranged on the screen at a position that is far from the driver's side as shown with 1603. Contrarily, in cases where the user is performing controls on the center display while the vehicle is stopped, if the workload switches to "Low" or "Medium" as a result of the user starting the vehicle, the display of options and the selection control on the center display are discontinued, and, while maintaining the reply method that was still being controlled, the process proceeds to the step of S315 of FIG. 3(*a*), and the control is succeeded as is.

FIG. 14(*c*) shows the definitions related to the workload level and the output contents of the HUD. Foremost, when the workload level is "None" or "Low", the name of the sender is displayed when the message is being read, and the control guide when sending a reply is displayed. When the workload level is "Medium", a message to the effect that a hand placement control is prohibited is displayed, or the screen of the control is maintained and displayed only when the workload level changes from "Low" to "Medium". When the workload level is "High", a warning message corresponding to the situation (for instance, "Keep distance!") is displayed.

FIG. 14(*d*) shows the definitions related to the workload level and the sound output from the speaker. When the workload level is "None" to "Medium", the control sound or the reading voice at such time is output. When the workload level is "High", only a warning sound is output. Note that, even when a message is being read, the output thereof is stopped. The stopped message that was being read is resumed and once again read from the beginning once the workload level becomes lower.

Note that the configuration may also be such that the user's hand placement detection algorithm and the feedback method are changed according to the workload level. For example, when the workload level is "Low" and the hand placement is detected when the user places one's hand for 0.5 seconds or longer, in cases where the workload level is "None", the setting is changed such that the hand placement is detected when the user places one's hand for 2 seconds or longer. Furthermore, when the workload level is "None", the feedback of hand placement based on a sound output is discontinued. Consequently, the hand placement detection algorithm which was devised so that the user can perform controls quickly and while looking straight ahead while driving can prevent erroneous detection based on operations other than hand placement operations, such as touch controls, by giving consideration to the fact that touch controls and taking one's eyes off the road are permitted while the vehicle is stopped.

As described above, based on the in-vehicle device 101 according to the second embodiment of the present invention, in addition to the user being able to intuitively and quickly perform controls while looking straight ahead even while driving the vehicle, the user can perform controls based on various means and receive more information when the user has much leeway such as when the vehicle is stopped, and the user can perform safe driving by preventing the user from focusing on other controls other than the driving operation in situations where the user should be concentrating on the driving operation.

Note that, while all of the embodiments explain the case of applying the present invention to an in-vehicle device, the present invention is not limited thereto, and may also be applied to devices such as a personal computer, digital signage, construction machinery, aircraft, or monitoring operator device that comprise a display unit and a control means.

[Embodiment 3]

<<Explanation of Configuration>>

Figure 17:
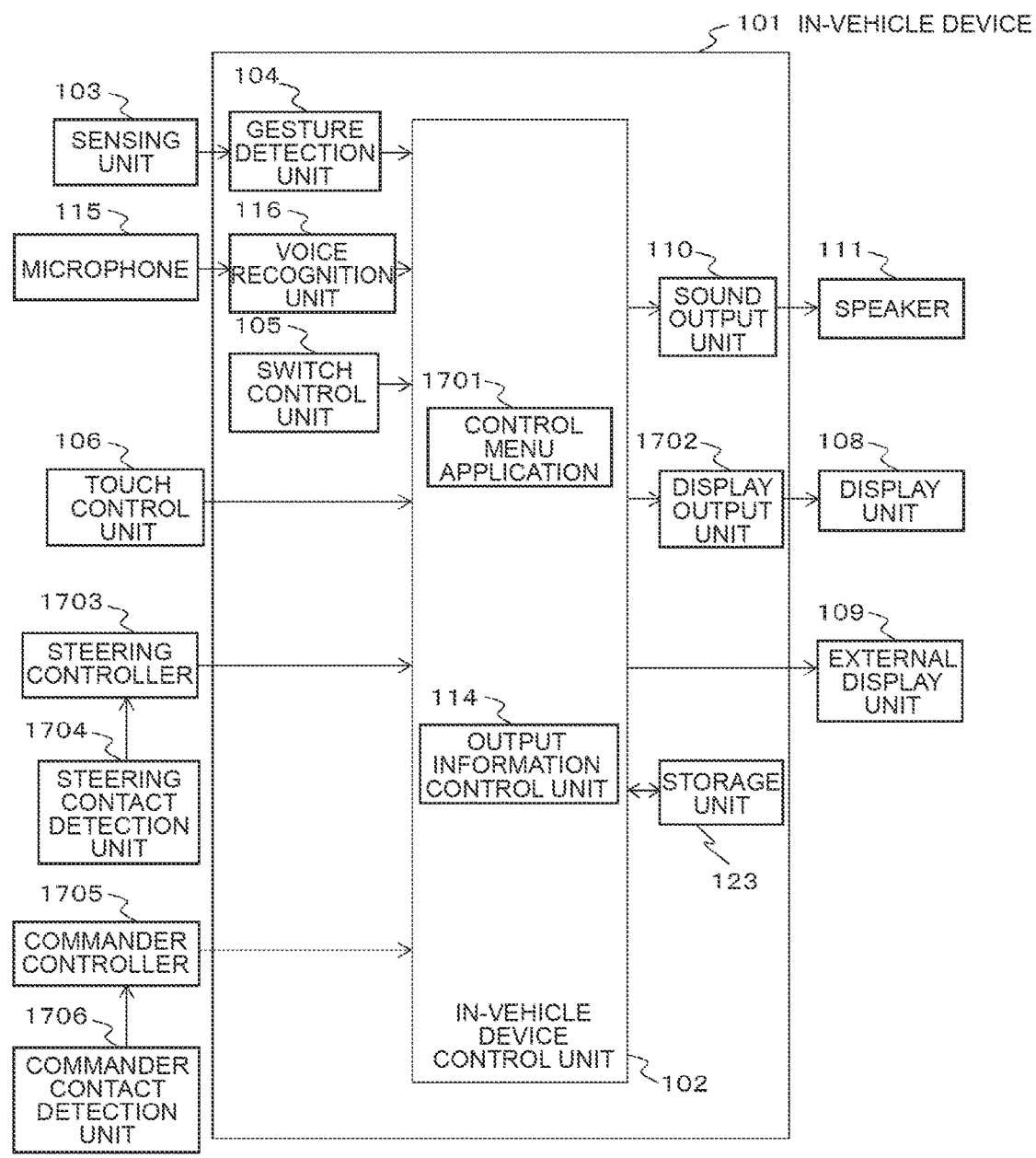
FIG. 17 shows a configuration diagram of an in-vehicle device in the third embodiment of the present invention.

FIG. 17 is a configuration diagram of the in-vehicle device 101 in this embodiment. In comparison to the configuration diagram of FIG. 1, a control menu application 1701, a display output unit 1702, a steering controller 1703, a steering contact detection unit 1704, a commander controller 1705, and a commander contact detection unit 1706 have been added.

The control menu application 1701 is software for displaying a control menu on the display unit 108 and the external display unit 109 according to the programs stored in the storage unit (not shown).

The display output unit 1702 has a function of outputting video signals to the display unit 108 in cases where a display device that is not built into the in-vehicle device 101 is used as the display unit 108.

The steering controller 1703 is a switch part that is mounted on the steering wheel, and is used by the user for inputting controls. Moreover, the steering contact detection unit 1704 detects whether the user's hand has come into contact with the switch part of the steering controller 1703.

The commander controller 1705 is a switch part that is mounted on the in-vehicle instrument panel or center console, and is used by the user for inputting controls. Moreover, the commander contact detection unit 1706 detects whether the user's hand has come into contact with the switch part of the commander controller 1705.

Figure 18:
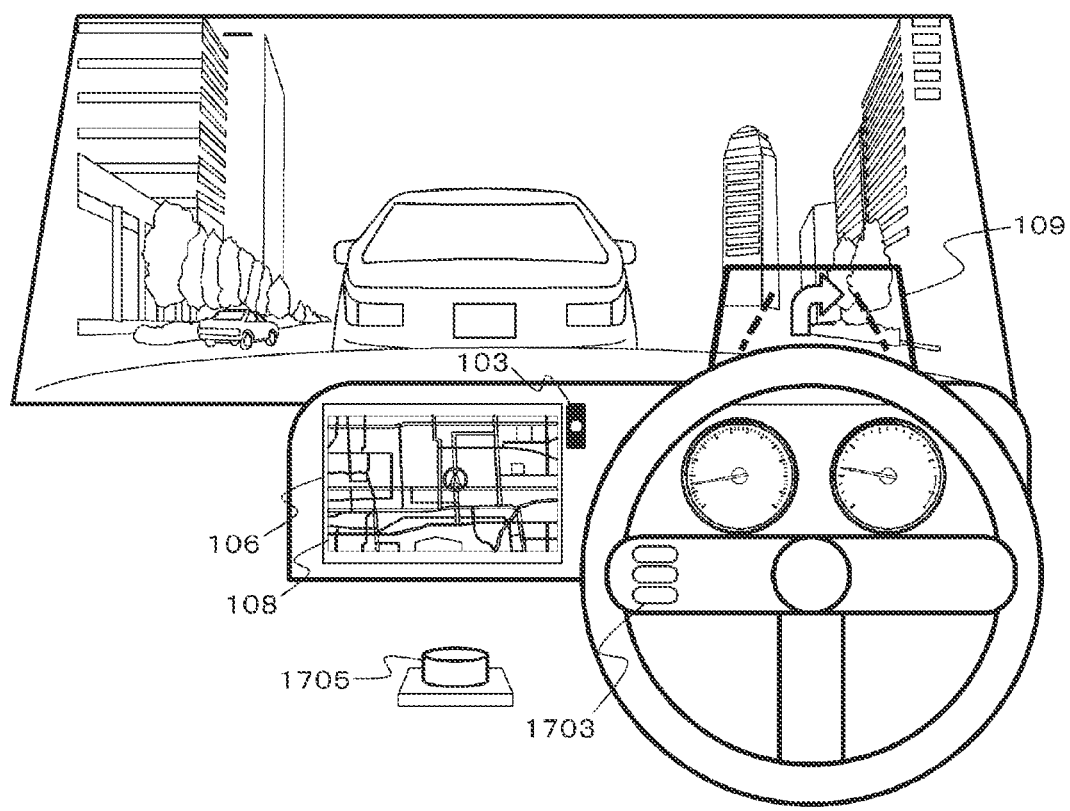
FIG. 18 shows an appearance example of a cockpit.

FIG. 18 shows the appearance of a cockpit in this embodiment. The display unit 108 is mounted at the center of the instrument panel, and touch controls can be performed with the touch control unit 106. Moreover, a sensing unit 103 for detecting gestures is provided at the upper right part of the display unit 108. The external display unit 109 is configured from an HUD, and can display various types of information while allowing the scenery ahead of the driver (user) to pass therethrough. The steering controller 1703 is provided in the steering wheel. Moreover, the commander controller 1705 is provided on the center console.

<<Explanation of Operation>>

The operation of the in-vehicle device 101 of this embodiment is now explained. The basic operation is the same as the operation explained in Embodiment 1, but this embodiment is unique in that the displayed contents of the display unit 108 and the external display unit 109 are changed based on the hand waving in the upward direction and the downward direction relative to the sensing unit 103, and that the shape of the control menu and control guide displayed on the external display unit 109 is changed according to the hand motion that is detected by the sensing unit 103.

Figure 19:
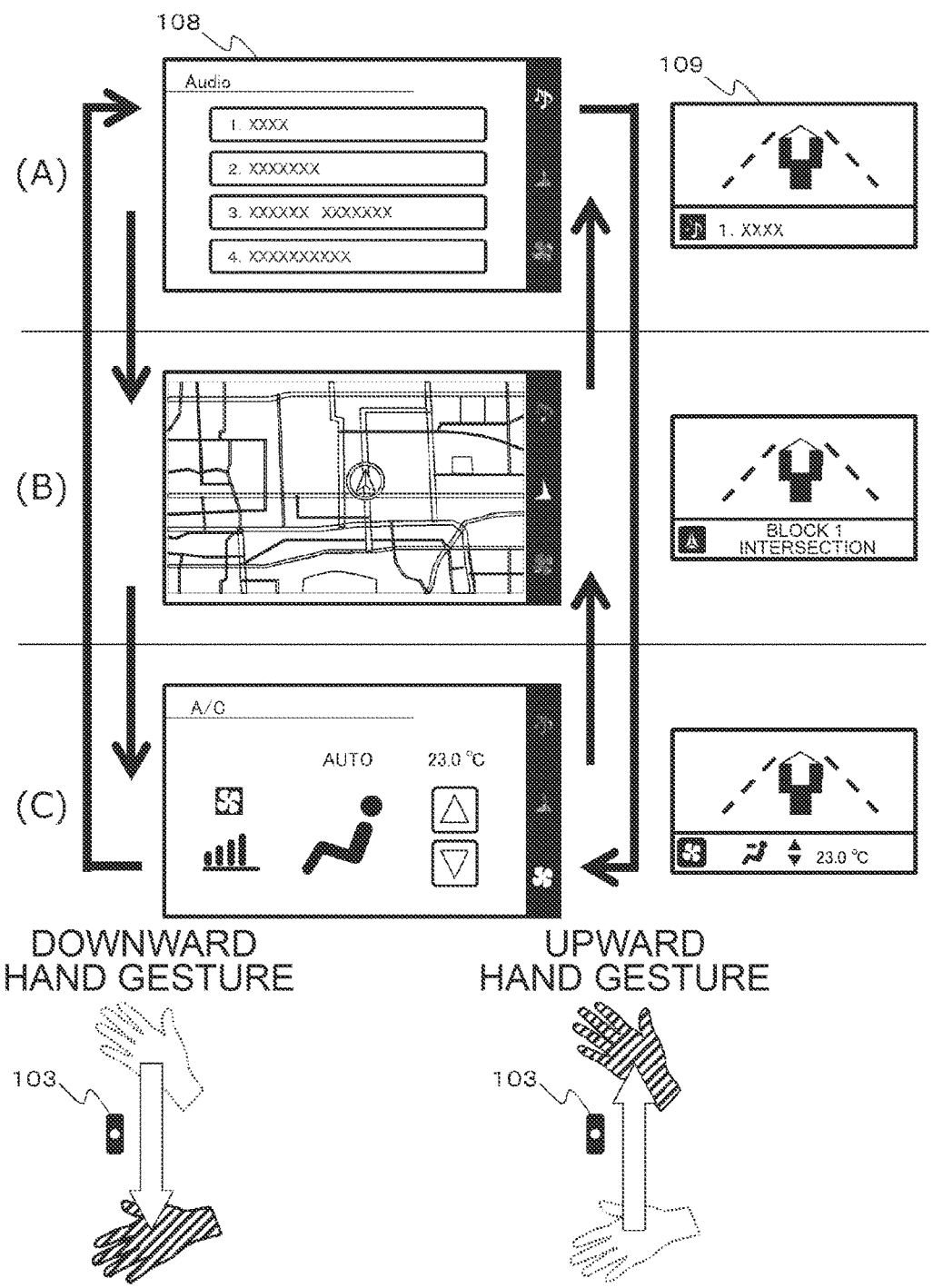
FIG. 19 shows a display example of a display unit and an external display unit.

FIG. 19 shows a state where the displayed contents of the display unit 108 and the external display unit 109 are changed based on the hand waving in the upward direction and the downward direction relative to the sensing unit 103. The respective screens of (A), (B) and (C) of FIG. 19 represent the display in the screen mode controlled by the control menu application 1701, and (A) shows an audio control mode, (B) shows a navigation control mode, and (C) shows an air-conditioning control mode. Each time the user wave's one hand in the upward direction once, the screen of the display unit 108 and the external display unit 109 switches from (A) to (B), from (B) to (C), and from (C) to (A) of FIG. 19.

Figure 20:
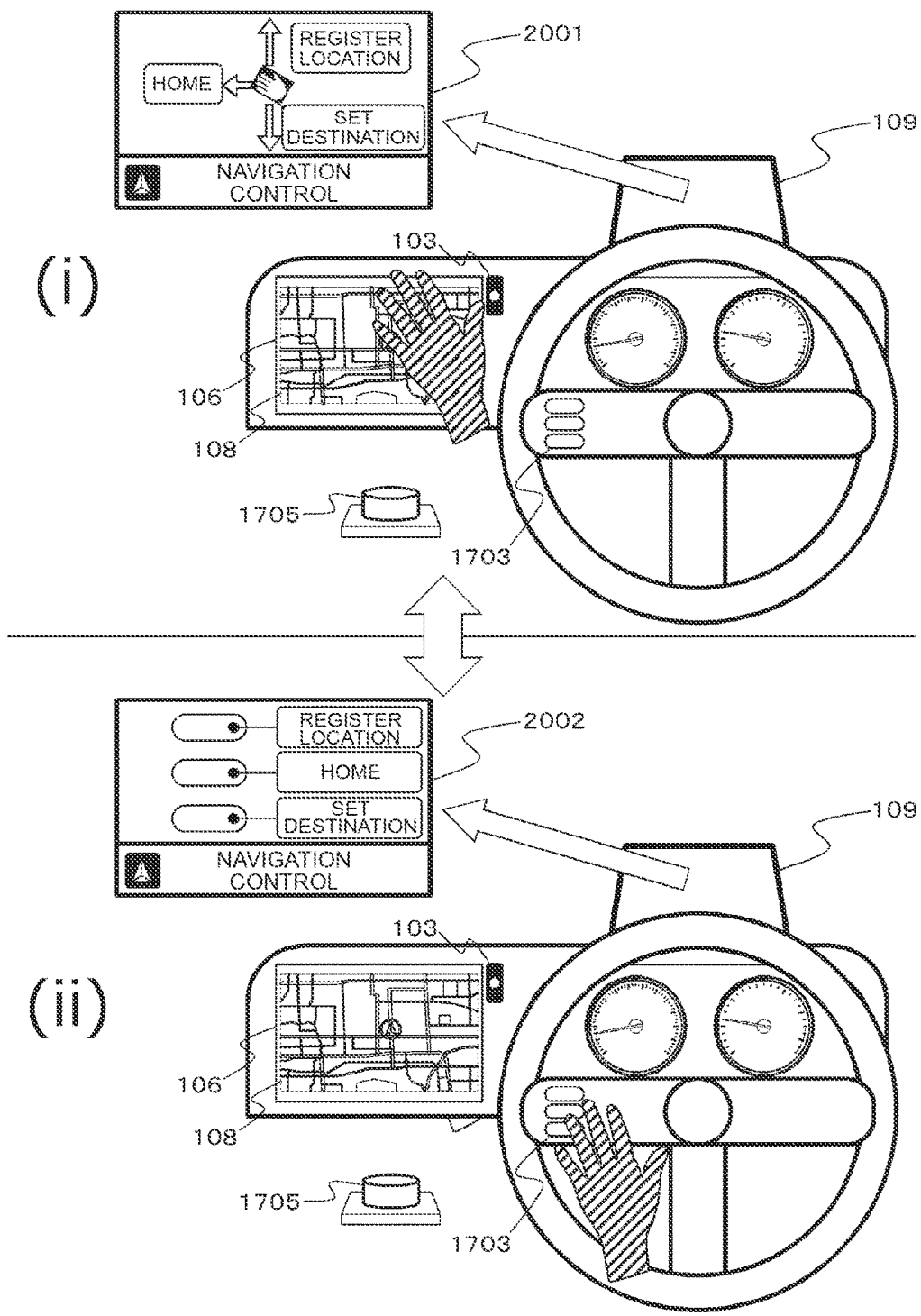
FIG. 20 shows an example of a control method based on gestures and a steering controller.

FIG. 20 shows a state where the user is performing controls based on gestures and the steering controller 1703 in the (B) navigation control mode. As shown in (i) of FIG. 20, when the user place's one hand over the sensing unit 103, the gesture control menu 2001 is displayed on the external display unit 109, and, by moving one's hand in one direction among upward, downward and leftward from the hand placement position, the user can select the item corresponding to that direction. Meanwhile, in (i) of FIG. 20, when the user returns one's hand to the steering wheel from the state of hand placement, the steering controller control menu 2002 is displayed as shown in (ii) of FIG. 20. In the state shown in (ii) of FIG. 20, by pressing one switch among the top switch, middle switch and bottom switch of the steering controller 1703, the user can select the item corresponding to the pressed switch. Note that, in the state shown in (ii) of FIG. 20, if the user once again places one's hand over the sensing unit 103 without pressing any switch, the screen returns to the stat shown in (i) of FIG. 20.

Figure 21:
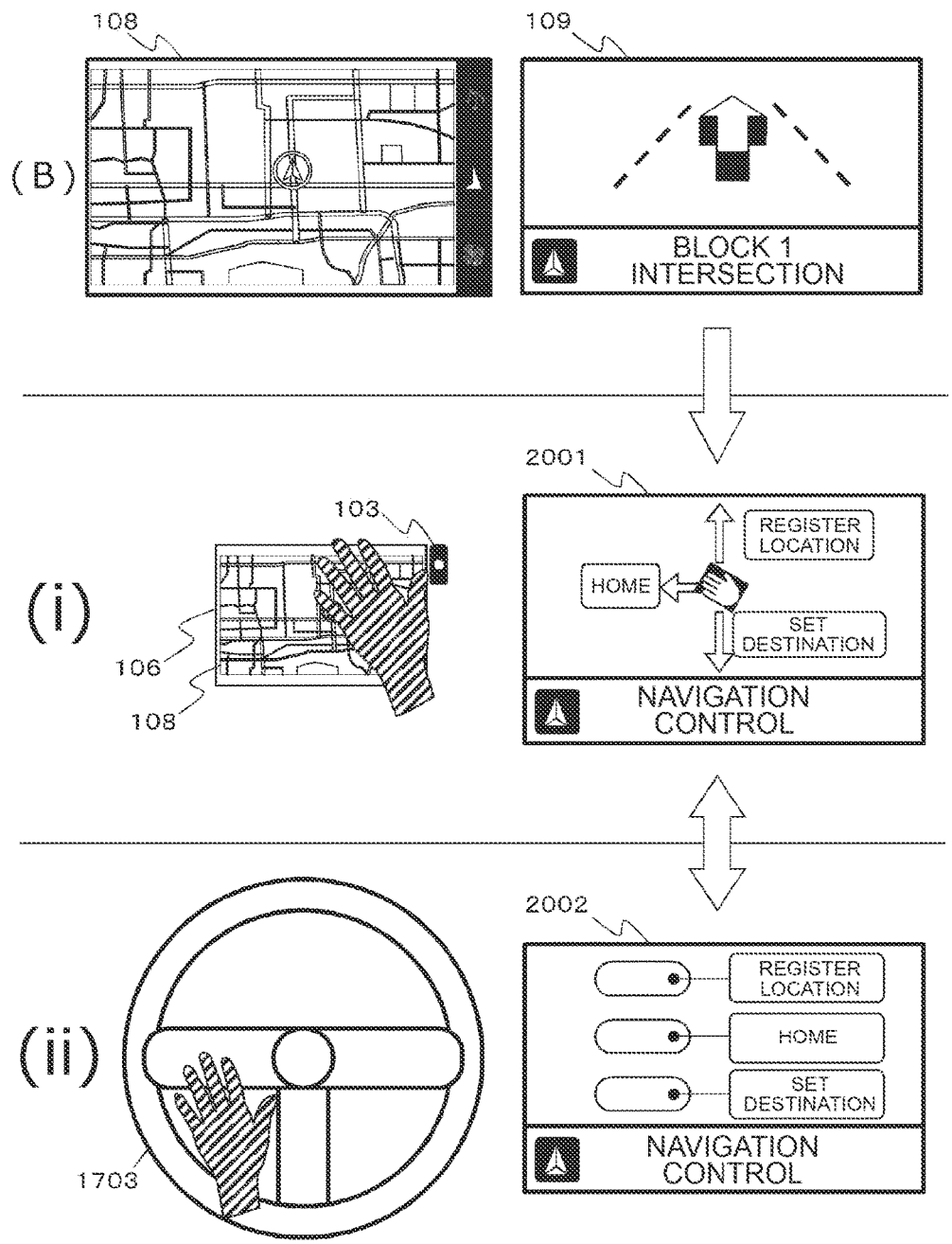
FIG. 21 shows a display example of an external display unit.
Figure 22:
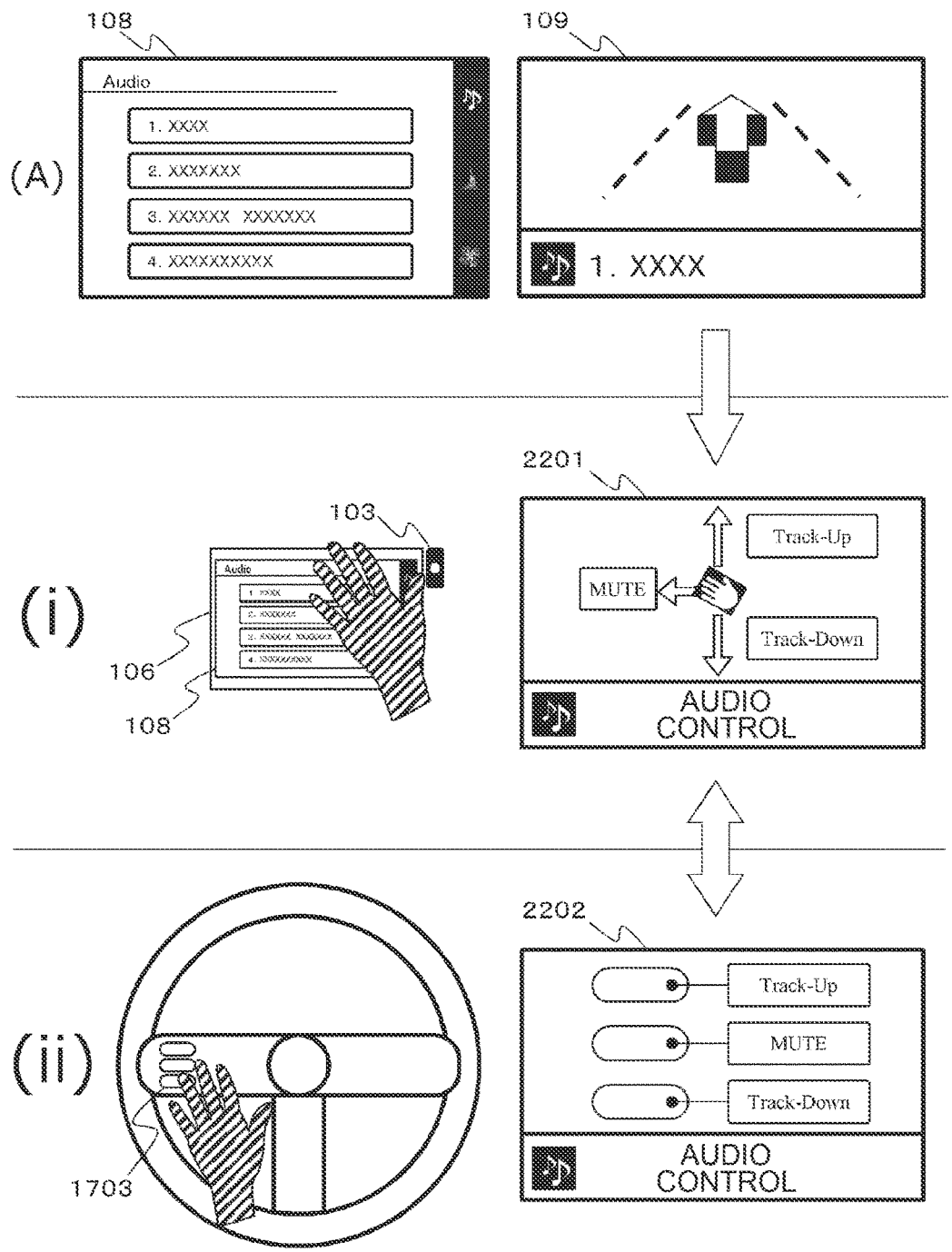
FIG. 22 shows a display example of an external display unit.
Figure 23:
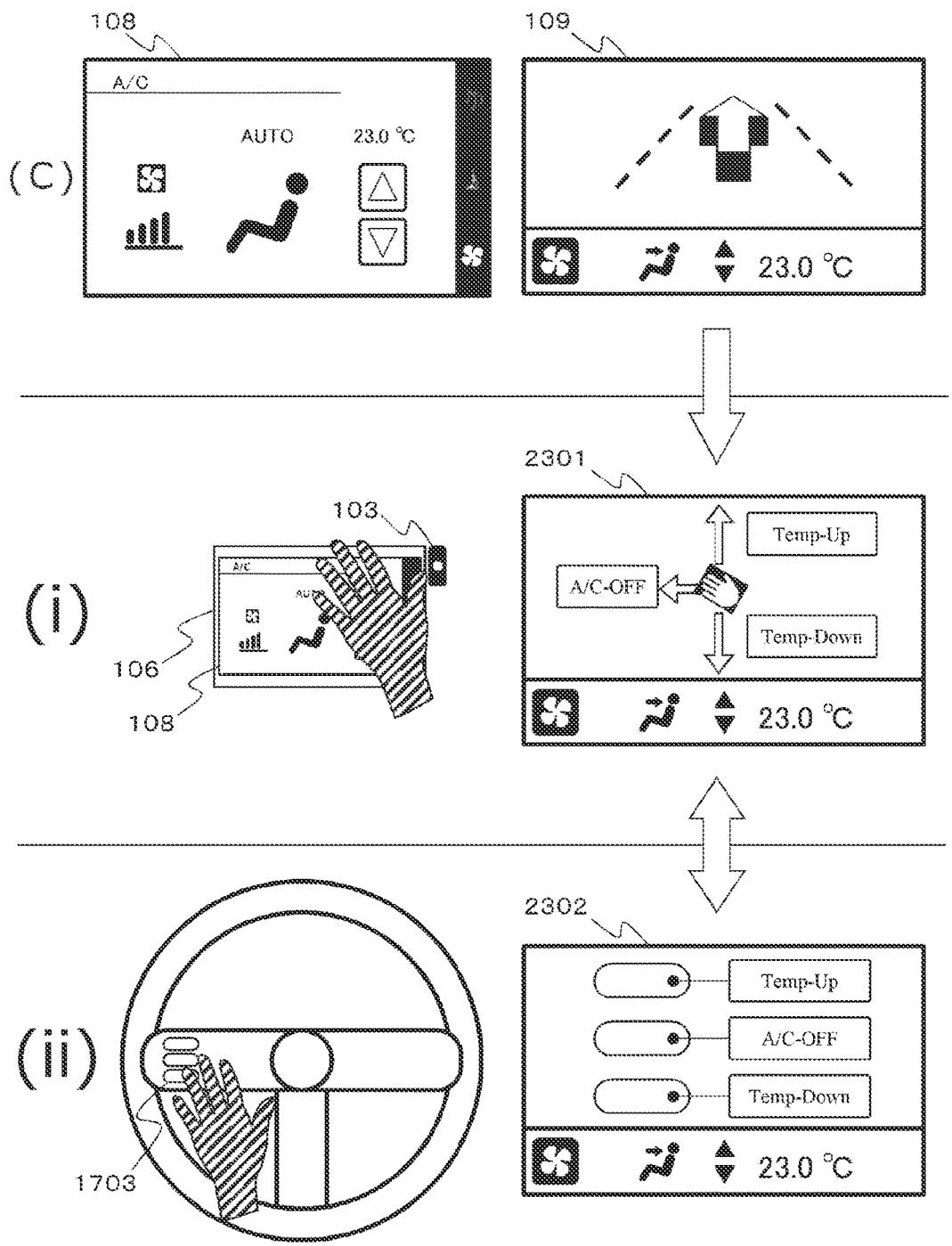
FIG. 23 shows a display example of an external display unit.

FIG. 21, FIG. 22, and FIG. 23 show the screen transition of the external display unit 109 in the series of operations explained with reference to FIG. 19 and FIG. 20. FIG. 21 shows the screen transition of the (B) navigation control mode, FIG. 22 shows the screen transition of the (A) audio control mode, and FIG. 23 shows the screen transition of the (C) air-conditioning control mode.

Figure 24:
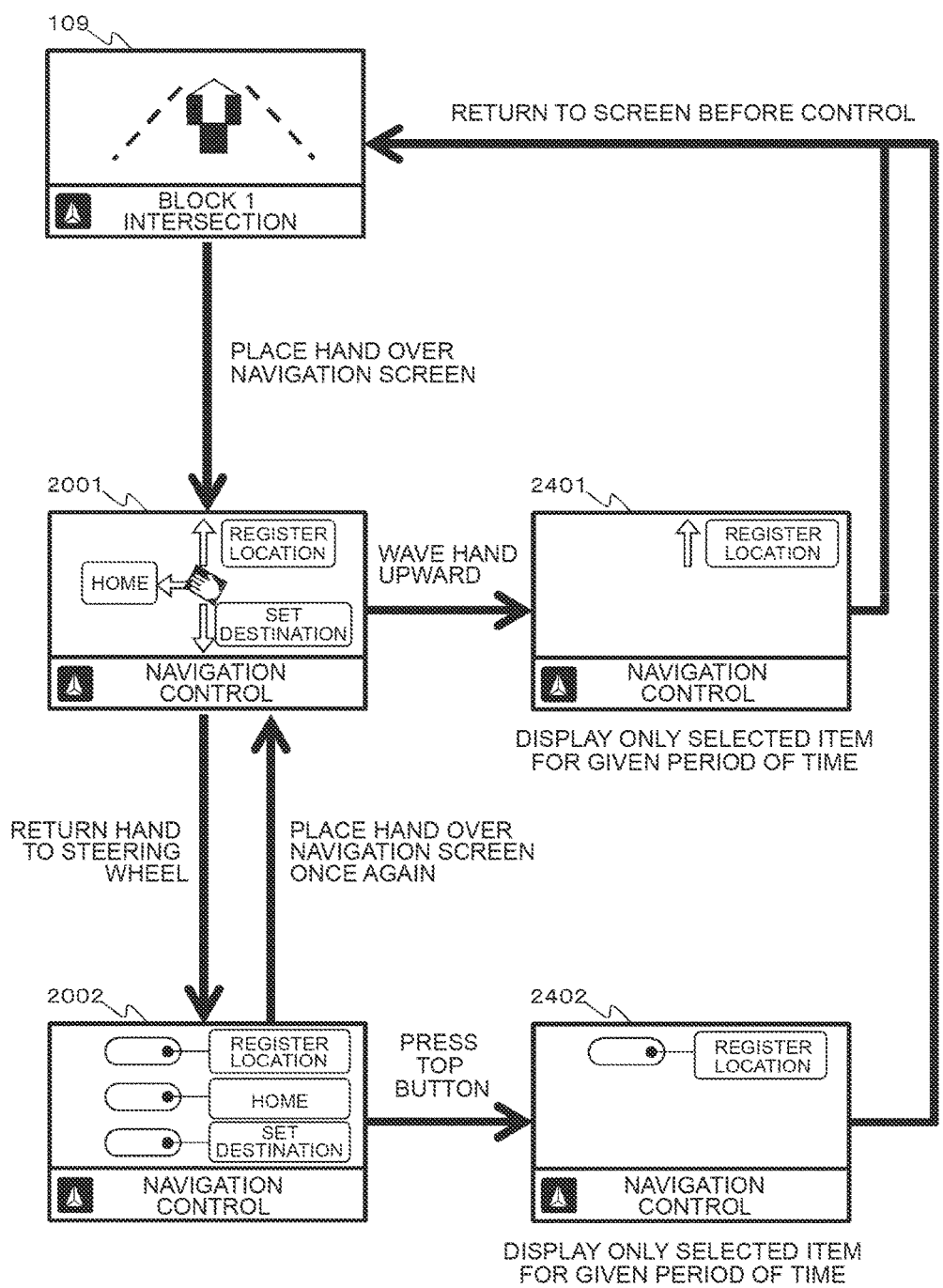
FIG. 24 shows an example of an operation flow.

FIG. 24 shows the detailed movement in the screen of the external display unit 109 in the (B) navigation control mode. As described above, when the user place's one's hand over the sensing unit 103 in the (B) navigation control mode, the gesture control menu 2001 is displayed on the external display unit 109. Here, when the user moves one's hand in the upward direction from the hand placement position, as shown in 2401 of FIG. 24, only the item corresponding to the upward direction is displayed for a predetermined time, and, based on this display, the user can confirm that the intended item has been selected. Moreover, when a predetermined time elapses from the display of 2401, the display of the external display unit 109 returns to the state before the user's hand placement. Note that the movement is the same for the steering controller control menu 2002.

FIG. 26(a) is a table showing the correspondence of the gesture detection status and the control device in the in-vehicle device 101 of this embodiment. Moreover, FIG. 26(c) is a table showing the correspondence of the control device and the display device according to a state where the vehicle is moving and a state where the vehicle is stopped. The output information control unit 114 of this embodiment determines the control device and the display device to be used in the control of a predetermined menu according to FIG. 26(a) and FIG. 26(c).

As shown in FIG. 26(a), when the user's hand is near the sensing unit 103, the output information control unit 114 determines that the user is attempting to perform a control with a gesture. Moreover, when the user's hand is removed from the sensing unit 103, the output information control unit 114 determines that the user is attempting to perform a control with the steering controller 1703. Note that, for vehicles that are not equipped with the steering controller 1703, the output information control unit 114 may determine that the user is attempting to perform a control with another control device such as a commander controller 1705 that is equipped in the vehicle. Based on the foregoing determination, the output information control unit 114 instructs the control menu application 1701 to output a predetermined screen. It is thereby possible to display the control menu and control guide that are suitable for the control device to be controlled by the user, and an effect is yielded in that the user can smoothly perform controls using the intended control device.

Moreover, as shown in FIG. 26(*c*), when the output information control unit 114 determines that the user is attempting to perform controls by using gestures, the steering controller 1703 and the commander controller 1705 while the vehicle is moving, the output information control unit 114 displays the control menu on the external display unit 109 (HUD). Consequently, because the user can visually confirm the control menu with minimal line of sight movement from the state of visually recognizing the forward view of the vehicle, an effect is yielded in that the influence on the driving operation caused by the control of the control menu can be suppressed.

Note that, while the vehicle is stopped, controls based on a touch panel with high controllability which enables detailed controls with the user's fingertips may also be permitted. For example, as shown in FIG. 25, in a state where the steering controller control menu 2002 is being displayed on the external display unit 109, when the user moves one's hand close to the sensing unit 103 while the vehicle is stopped, a advanced menu as shown in 2501 of FIG. 25 may be displayed on the display unit 108, and controls may be performed based on touch control. Furthermore, when the vehicle starts moving again, the display of the display unit 108 may be turned off, and the steering controller control menu 2002 may be displayed once again on the external display unit 109. Consequently, an effect is yielded in that the user can switch to a touch panel control and perform controls efficiently based on a touch control in circumstances where the driving operation will not be hindered, such as when the vehicle is stopped.

Figure 27:
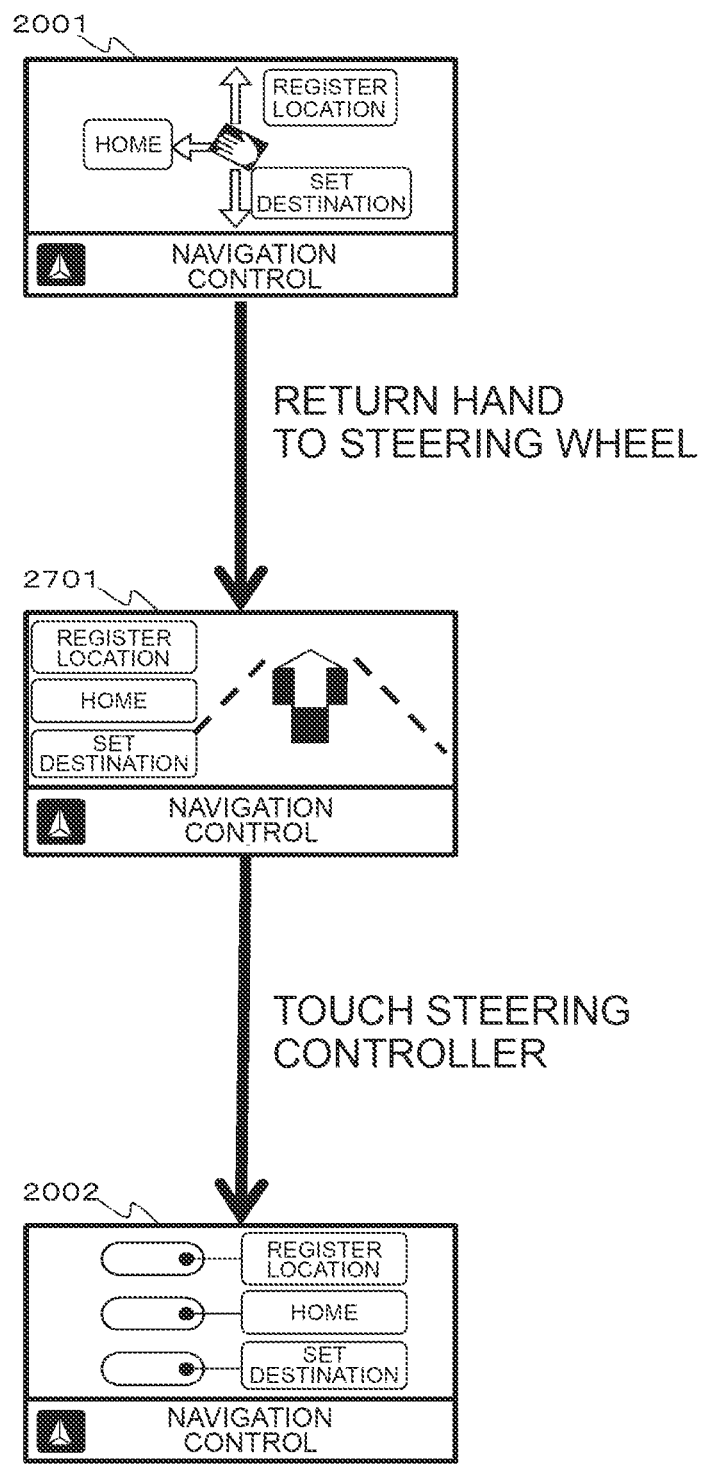
FIG. 27 shows an example of an operation flow.

In this embodiment, while the steering controller control menu 2002 is displayed on the external display unit 109 when the user returns one's hand to the steering wheel, the display of the steering controller control menu 2002 may feel bothersome when the user wishes to perform the driving operation with the hand that was returned to the steering. Thus, as shown in FIG. 27, when the user returns one's hand to the steering wheel, a simplified menu in which the part where the menu is to be displayed in the external display unit 109 is reduced in size as shown in 2701 of FIG. 27 may be displayed, and the steering controller control menu 2002 may be displayed when the steering contact detection unit 1704 detects that the user has touched the switch of the steering controller 1703. Consequently, because the steering controller control menu 2002 is not displayed right up until the user controls the steering controller 1703, it is possible to reduce the botheration of the menu display, and also yield the effect of effectively using the display of the external display unit 109 for displaying other information required for driving.

Figure 28:
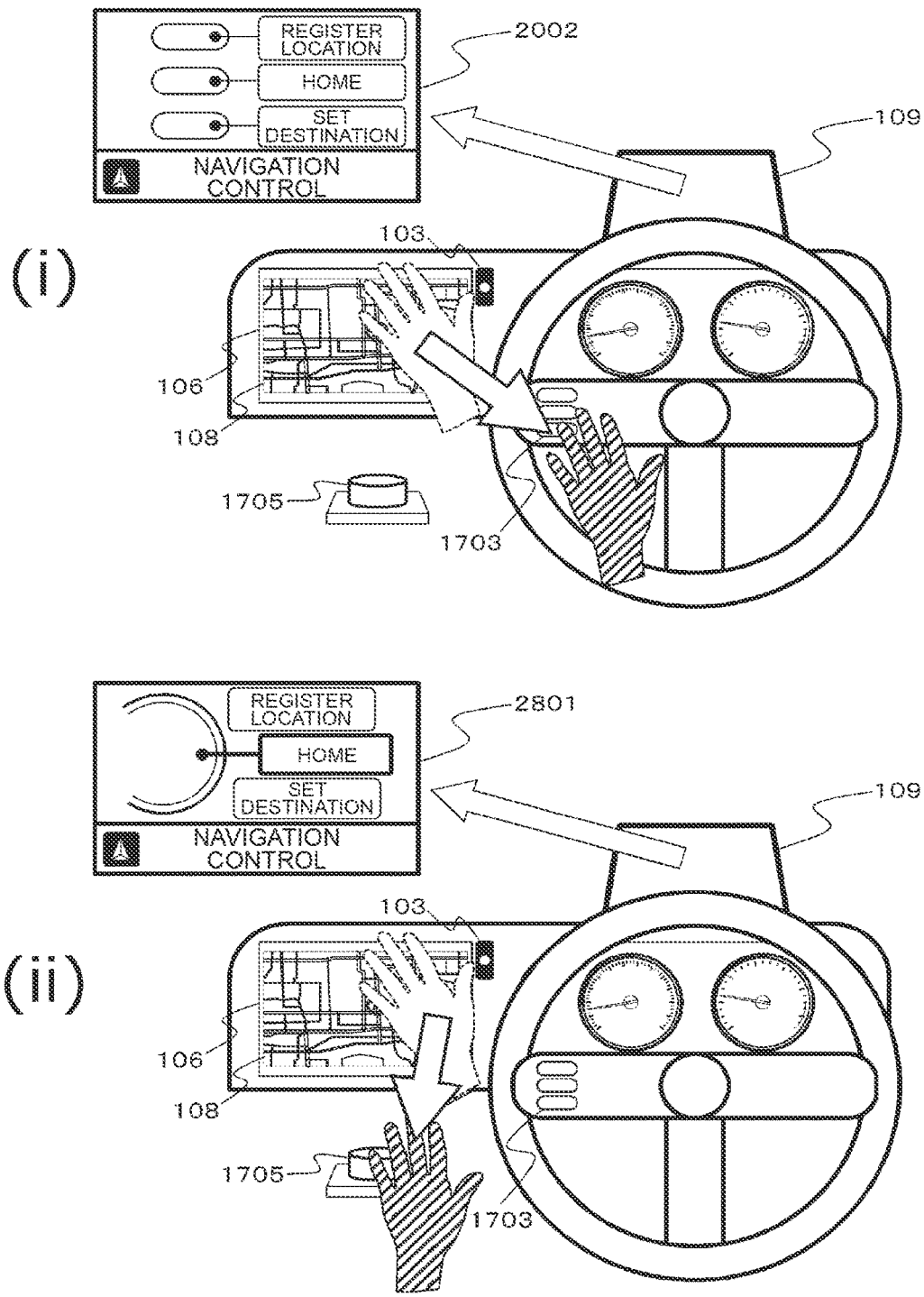
FIG. 28 shows an example of a control method based on a steering controller and a command controller.

[Embodiment 4]
<<Explanation of Configuration>>
FIG. 28 shows the appearance of the control of the in-vehicle device 101 in this embodiment. In comparison to the external view of FIG. 20, a screen where the commander control menu 2801 is displayed on the external display unit 109 when the user places one's hand near the commander controller 1705 has been added. Moreover, in this embodiment, a camera is used as the sensing unit 103 as shown in FIG. 9. The sensing unit 103 of this embodiment detects in which direction the user's hand is moving in the periphery of the sensing unit 103. Note that, so as long as it is possible to detect in which direction the user's hand is moving, the sensing unit 103 may be a sensing device other than a camera.

<<Explanation of Operation>>
The operation of the in-vehicle device 101 of this embodiment is now explained. The basic operation is the same as the operation explained in Embodiment 3, but this embodiment is unique in that the shape of the control menu and control guide displayed on the external display unit 109 is changed based on detecting in which direction the user's hand is moving in the periphery of the sensing unit 103.

FIG. 28 shows a state where the user is performing controls based on gestures, the steering controller 1703 and the commander controller 1705 in the (B) navigation control mode. As shown in (i) of FIG. 28, when the user moves one's hand in the direction of the steering wheel from a state of placing one's hand over the sensing unit 103, the steering controller control menu 2002 is displayed as shown in (i) of FIG. 28. Meanwhile, when the user moves one's hand in the direction of the commander controller 1705 from a state of placing one's hand over the sensing unit 103 as shown in (ii) of FIG. 28, the control menu 2801 of the commander controller 1705 is displayed as shown in (ii) of FIG. 28. In the state shown in (ii) of FIG. 28, by rotating the rotary controller once, the user can select one item in correspondence with the rotary controlled equipped in the commander controller 1705.

FIG. 26(*b*) is a table showing the selection of the control device according to the position and moving direction of the hand in the in-vehicle device 101 of this embodiment. The output information control unit 114 of this embodiment decides the control device to be used for the control of a predetermined menu according to FIG. 26(*b*).

As shown in FIG. 26(*b*), when the user's hand is near the sensing unit 103, the output information control unit 114 determines that the user is attempting to perform a control with a gesture. Moreover, when the user's hand moves from the sensing unit 103 in the direction or to the position of the steering controller 1703, the output information control unit 114 determines that the user is attempting to perform the control with the steering controller 1703. Furthermore, when the user's hand moves from the sensing unit 103 in the direction or to the position of the commander controller 1705, the output information control unit 114 determines that the user is attempting to perform the control with the commander controller 1705. Note that the steering controller 1703 and the commander controller 1705 may be other control devices equipped in the vehicle. Based on the foregoing determination, the output information control unit 114 instructs the control menu application 1701 to output a predetermined screen. It is thereby possible to display the control menu and control guide that are suitable for the control device to be controlled by the user, and an effect is yielded in that the user can smoothly perform controls using the intended control device.

Figure 29:
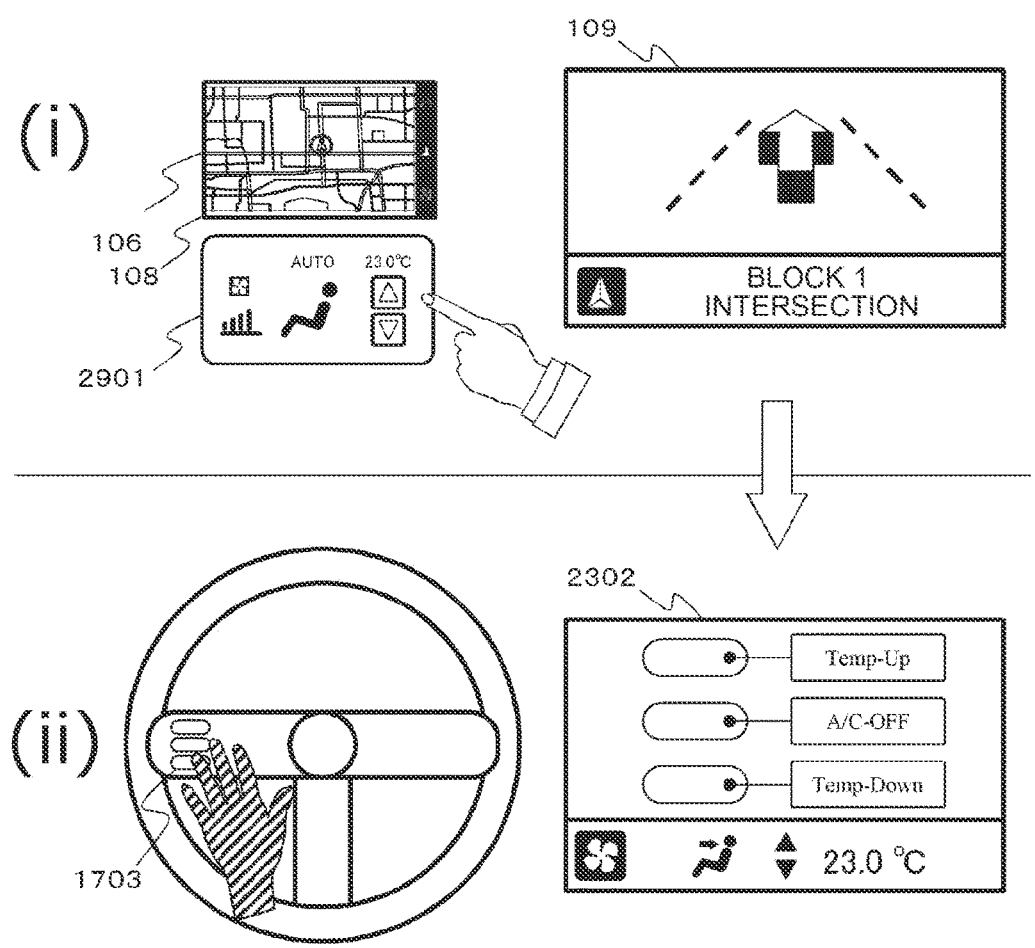
FIG. 29 shows an example of a control method based on a gesture and a steering controller.

Note that, upon displaying the control menu, the determination may also be made based on the user's finger-pointing direction detected by the sensing unit 103 rather than based on the direction or position that the user's hand moved from the sensing unit 103. For example, as shown in FIG. 29, the sensing unit 103 may detect that the user pointed one's finger to the air-conditioning control panel 2901 in the state shown in (i) of FIG. 29, and the steering controller control menu 2302 for air-conditioning control may be displayed on the external display unit 109 based on the foregoing detection. Consequently, an effect is yielded in that the intended control menu can be displayed even more smoothly without the user having to place one's hand over the sensing unit 103 even once.

The disclosure of the following priority application is incorporated herein by reference. Japanese Patent Application No. 2015-31324 (filed on Feb. 20, 2015)

REFERENCE SIGNS LIST

101 In-vehicle device
102 In-vehicle device control unit
103 Sensing unit
104 Gesture detection unit
105 Switch control unit
106 Touch control unit
107 Communication unit
108 Display unit
109 External display unit
110 Sound output unit
111 Speaker
112 Tactile IF output unit
113 Messenger application
114 Output information control unit
115 Microphone
116 Voice recognition unit
117 External switch control unit
118 Vehicle information input unit
119 Control means control unit
120 Workload estimation unit
121 Map DB
1701 Control menu application
1702 Display output unit
1703 Steering controller
1704 Steering contact detection unit
1705 Commander controller
1706 Commander contact detection unit
2001 Gesture control menu
2002 Steering control menu
2201 Gesture control menu
2202 Steering control menu
2301 Gesture control menu
2302 Steering control menu
2401 Item selection state
2402 Item selection state
2501 Advanced menu
2701 Simplified menu
2801 Commander controller control menu

The invention claimed is:

1. An in-vehicle device that improves safety and controllability of in-vehicle equipment by a driver, the in-vehicle device comprising:
a display;
a plurality of sensors including a gesture sensor that recognize a position of a hand of the driver located within a predetermined range; and
a memory that stores a plurality of programs, wherein the plurality of programs when executed cause the in-vehicle device to:
detect, using the plurality of sensors, that the hand has been placed at a predetermined position for a given length of time, and
on a first condition that the hand is detected at the predetermined position for the given length of time:
display, using the display, candidates of an operation to be executed according to a first input method, wherein the first input method is associates by the candidates with motions of the hand,
detect, using the plurality of sensors, that the hand has moved from the predetermined position, and
on a second condition that the hand is detected to have moved from the predetermined position:
display, using the display, an indication of a change from the first input method to a second input method, wherein the second input method includes at least one of touch mode or voice mode, and
receive, using the plurality of sensors, a selection from the driver using the second input method.

2. The in-vehicle device according to claim 1, wherein the plurality of programs further cause the in-vehicle device to:
select a system of the vehicle to be subsequently controlled by the driver according to a moving direction of the hand detected; and
change the indication according to the system of the vehicle selected.

3. The in-vehicle device according to claim 1, wherein the plurality of programs further cause the in-vehicle device to:
select a system of the vehicle to be subsequently controlled by the driver according to a position where the hand was moved after the hand has been placed at the predetermined position for the given length of time; and
change the indication according to the system of the vehicle selected.

4. An in-vehicle device that improves safety and controllability of in-vehicle equipment by a driver, the in-vehicle device comprising:
a plurality of displays;
a plurality of sensors including a gesture sensor that recognize a position of a hand of the driver located within a predetermined range; and
a memory that stores a plurality of programs, wherein the plurality of programs when executed cause the in-vehicle device to:
detect, using the plurality of sensors, that the hand has been placed at a predetermined position for a given length of time, and
on a first condition that the hand is detected at the predetermined position for the given length of time:
select a particular display from the plurality of displays, wherein the particular display is a display in which a line of sight movement of the driver from a front of the vehicle is smallest,
display, using the particular display, candidates of an operation to be executed according to a first input method, wherein the first input method associates the candidates with motions of the hand,
detect, using the plurality of sensors, that the hand has moved from the predetermined position, and
on a second condition that the hand is detected to have moved from the predetermined position:
display, using the particular display, an indication of a change from the first input method to a second input method, wherein the second input method includes at least one of touch mode or voice mode, and receive, using the plurality of sensors, a selection from the driver using the second input method.

5. The in-vehicle device according to claim 1, wherein the plurality of sensors includes a touch sensor that detects a touch of the hand, wherein the plurality of programs further cause the in-vehicle device to:

detect a touch of the hand after the hand has been placed at the predetermined position for the given length of time, and change the second input method to the touch mode.

6. The in-vehicle device according to claim 1, wherein the indication includes a control guide for the input second method.

7. The in-vehicle device according to claim 4, wherein the indication includes a control guide for the input second method.

* * * * *